US011085425B2

(12) United States Patent
Heinen

(10) Patent No.: US 11,085,425 B2
(45) Date of Patent: Aug. 10, 2021

(54) POWER GENERATION SYSTEMS BASED ON THERMAL DIFFERENCES USING SLOW-MOTION HIGH-FORCE ENERGY CONVERSION

(71) Applicant: Raytheon Company, Waltham, MA (US)

(72) Inventor: Gregory W. Heinen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/451,852

(22) Filed: Jun. 25, 2019

(65) Prior Publication Data
US 2020/0408196 A1 Dec. 31, 2020

(51) Int. Cl.
*F03G 7/05* (2006.01)
*B63G 8/00* (2006.01)
*H02K 7/06* (2006.01)
*H02K 7/116* (2006.01)
*H02K 7/18* (2006.01)

(52) U.S. Cl.
CPC ............ *F03G 7/05* (2013.01); *B63G 8/001* (2013.01); *H02K 7/06* (2013.01); *H02K 7/116* (2013.01); *H02K 7/1807* (2013.01); *B63G 2008/002* (2013.01); *Y02E 10/30* (2013.01)

(58) Field of Classification Search
CPC .. B63G 8/001; B63G 22/18; B63G 2008/002; B63G 2008/004; H02K 7/1823; H02K 7/06; H02K 7/116; H02K 7/1807; B63B 2211/02; F03B 3/04; F05B 2220/706; F03G 2006/006; F03G 2006/008; F03G 2006/061; F03G 2006/062; F03G 6/00–068; F03G 7/04–05; F24S 10/45; F24S 10/25;
(Continued)

(56) References Cited

U.S. PATENT DOCUMENTS 952,452 A 3/1910 Leon
1,108,192 A 8/1914 Lagergren
(Continued)

FOREIGN PATENT DOCUMENTS

CN 201550121 U 8/2010
CN 205081799 U 3/2016
(Continued)

OTHER PUBLICATIONS

GYSIN AG, "Planetary Gearbox GPL090," May 2015, 1 page.
(Continued)

*Primary Examiner* — Mark A Laurenzi
*Assistant Examiner* — Mickey H France

(57) ABSTRACT

An apparatus includes first and second tanks each configured to receive and store a refrigerant under pressure. The apparatus also includes a cylinder defining a space configured to receive the refrigerant from the first and second tanks. The apparatus further includes a piston passing into the cylinder and having a head, where the head divides the space within the cylinder into a first volume for the refrigerant from the first tank and a second volume for the refrigerant from the second tank. In addition, the apparatus includes a converter configured to translate linear movement of the piston into rotational motion and a generator configured to produce electrical power based on the rotational motion.

20 Claims, 10 Drawing Sheets

(58) Field of Classification Search
CPC ........ F24S 10/40; C23C 28/42; C23C 28/345; F03D 9/17
USPC .......... 60/643–684, 641.1–641.15, 614–620; 126/561–713
See application file for complete search history.

(56) References Cited

U.S. PATENT DOCUMENTS

| | | |
|---|---|---|
| 1,315,267 A | 9/1919 | White |
| 1,361,561 A | 12/1920 | Yancey |
| 1,421,369 A | 7/1922 | Ardo |
| 1,710,670 A | 4/1929 | Bonney |
| 2,000,746 A | 5/1935 | Dray |
| 2,381,478 A | 8/1945 | Zukor |
| 2,537,929 A | 1/1951 | Daly |
| 2,642,693 A | 6/1953 | Broady |
| 2,720,367 A | 10/1955 | Doolittle |
| 2,750,794 A | 6/1956 | Downs |
| 2,783,955 A | 3/1957 | Fitz |
| 2,823,636 A | 2/1958 | Gongwer |
| 2,826,001 A | 3/1958 | Presnell |
| 2,845,221 A | 7/1958 | Vine |
| 2,911,792 A | 11/1959 | Rinia |
| 2,964,874 A | 12/1960 | Ruiz |
| 3,157,145 A | 11/1964 | Farris |
| 3,275,418 A | 9/1966 | Nee |
| 3,376,588 A | 4/1968 | Berteaux |
| 3,698,345 A | 10/1972 | Kreitner |
| 3,815,555 A | 6/1974 | Tubeuf |
| 3,818,523 A | 6/1974 | Stillman, Jr. |
| 3,901,033 A | 8/1975 | McAlister |
| 3,918,263 A | 11/1975 | Swingle |
| 4,255,934 A | 3/1981 | Stephenson |
| 4,269,030 A | 5/1981 | Osborne |
| 4,403,154 A | 9/1983 | Reale et al. |
| 4,445,818 A | 5/1984 | Ohsaki et al. |
| 4,529,120 A | 7/1985 | Fleshman, Jr. |
| 4,577,583 A | 3/1986 | Green, II |
| 4,850,551 A | 7/1989 | Krawetz et al. |
| 4,919,637 A | 4/1990 | Fleischmann |
| 5,134,955 A | 8/1992 | Manfield |
| 5,291,847 A | 3/1994 | Webb |
| 5,303,552 A | 4/1994 | Webb |
| 5,579,640 A | 12/1996 | Gray, Jr. et al. |
| 5,615,632 A | 4/1997 | Nedderman, Jr. |
| 6,142,092 A | 11/2000 | Coupland |
| 6,263,819 B1 | 7/2001 | Gorustein et al. |
| 6,328,622 B1 | 12/2001 | Geery |
| 6,540,244 B1 | 4/2003 | Oda |
| 6,601,471 B2 | 8/2003 | Tarnopolsky et al. |
| 6,651,167 B1 | 11/2003 | Terao et al. |
| 6,694,844 B2 | 2/2004 | Love |
| 6,724,574 B2 | 4/2004 | Wada et al. |
| 6,807,921 B2 | 10/2004 | Huntsman |
| 7,077,072 B2 | 7/2006 | Wingett et al. |
| 7,410,395 B2 | 8/2008 | Kawai et al. |
| 7,501,788 B2 | 3/2009 | De Abreu |
| 8,046,990 B2 | 11/2011 | Bollinger et al. |
| 8,069,808 B1 | 12/2011 | Imlach et al. |
| 8,106,527 B1 | 1/2012 | Carr |
| 8,109,223 B2 | 2/2012 | Jamieson |
| 8,117,842 B2 | 2/2012 | McBride et al. |
| 8,205,570 B1 | 6/2012 | Tureaud et al. |
| 8,794,003 B2 | 8/2014 | Mauran et al. |
| 9,797,386 B2 | 10/2017 | Cole et al. |
| 9,834,288 B1 | 12/2017 | Heinen |
| 9,835,145 B1 | 12/2017 | Freeman |
| 10,017,060 B2 | 7/2018 | Heinen et al. |
| 10,036,510 B2 | 7/2018 | Heinen et al. |
| 10,364,006 B2 | 7/2019 | Heinen |
| 2005/0149236 A1 | 7/2005 | Potter et al. |
| 2005/0217816 A1 | 10/2005 | Mitschker et al. |
| 2005/0279270 A1 | 12/2005 | Wingett et al. |
| 2006/0059912 A1 | 3/2006 | Romanelli et al. |
| 2007/0186553 A1 | 8/2007 | Lin |
| 2008/0022681 A1 | 1/2008 | Tafas |
| 2008/0088171 A1 | 4/2008 | Cheng |
| 2009/0126364 A1 | 5/2009 | Mills et al. |
| 2009/0178603 A1 | 7/2009 | Imlach et al. |
| 2009/0277400 A1 | 11/2009 | Conry |
| 2009/0320477 A1 | 12/2009 | Juchymenko |
| 2010/0192575 A1 | 8/2010 | Al-Mayahi et al. |
| 2010/0319339 A1* | 12/2010 | Davis ..................... F03B 17/00 60/495 |
| 2010/0327605 A1 | 12/2010 | Andrews |
| 2011/0051880 A1 | 3/2011 | Al-Mayahi et al. |
| 2011/0101579 A1 | 5/2011 | Polakowski et al. |
| 2011/0113806 A1 | 5/2011 | King et al. |
| 2011/0314811 A1 | 12/2011 | Jones et al. |
| 2012/0091942 A1 | 4/2012 | Jones et al. |
| 2012/0260908 A1 | 10/2012 | Orsello |
| 2012/0289103 A1 | 11/2012 | Hudson et al. |
| 2013/0068973 A1 | 3/2013 | van Ruth |
| 2013/0180243 A1 | 7/2013 | Hurtado |
| 2015/0000275 A1 | 1/2015 | Prueitt |
| 2015/0033717 A1 | 2/2015 | Hsu |
| 2015/0369221 A1 | 12/2015 | Minovitch |
| 2016/0298498 A1 | 10/2016 | Kreuger |
| 2017/0349252 A1 | 12/2017 | Heinen |
| 2018/0118315 A1 | 5/2018 | Heinen et al. |
| 2018/0118316 A1 | 5/2018 | Heinen et al. |
| 2018/0119990 A1 | 5/2018 | Alsadah |
| 2018/0209308 A1 | 7/2018 | Heinen et al. |

FOREIGN PATENT DOCUMENTS

| | | |
|---|---|---|
| CN | 206421300 U | 8/2017 |
| DE | 215277 C | 12/1906 |
| EP | 2660433 A1 | 11/2013 |
| EP | 2698506 A1 | 2/2014 |
| GB | 235363 A | 6/1925 |
| GB | 541775 A | 12/1941 |
| GB | 658070 A | 10/1951 |
| GB | 2422877 A | 8/2006 |
| GB | 2556968 A | 6/2018 |
| JP | H111113961 A | 4/1999 |
| JP | 2001305226 A | 10/2001 |
| TW | 201018785 A | 5/2010 |
| WO | 9641079 A1 | 12/1996 |
| WO | 2011000062 A1 | 1/2011 |
| WO | 2015/161921 A1 | 10/2015 |

OTHER PUBLICATIONS

GYSIN AG, "Planetary Gearbox GPL120," Jan. 2016, 1 page.
Maxon academy, "mason Motors as Generators," Feb. 2015, 14 pages.
IndustrialPartsShop, "Specification for W2514-169GK1X-C7T," Feb. 2019, 4 pages.
International Search Report and Written Opinion of the International Searching Authority for PCT Patent Application No. PCT/US2016/062518 dated May 18, 2017, 12 pages.
International Search Report and Written Opinion of the International Searching Authority for PCT Patent Application No. PCT/US2017/017499 dated May 29, 2017, 13 pages.
International Search Report and Written Opinion of the International Searching Authority for PCT Patent Application No. PCT/US2017/016976 dated Feb. 12, 2018, 18 pages.
"1/14 8x8 Armageddon Hydraulic Dump Truck (Full Metal)", http://www.rc4wdfor"m.com/showthread php?12884-1-14-8x8-Armageddon-Hydraulic-Dump-Truck, Aug. 2016, 23 pages.
Aintablain et al., "A Hydraulic Motor-Alternator System for Ocean-Submersible Vehicles", 10th International Energy Conversion Engineering Conference, Jul. 2012, 13 pages.
Aintablian et al., "A Hydraulic-Alternator System for Ocean Submersible Vehicles", IECEC 2012, Jul. 2012, 12 pages.
Berkner, "How, Why, and When to apply electric motors to mobile hydraulic systems", Parker Hannifin 2008 Global Mobile Sales Meeting & Symposium, Whitepaper #0001, 2008, 10 pages.
Bowen et al., "The Nereus Hybrid Underwater Robotic Vehicle for Global Ocean Science Operations to 11,000m Depth," IEEE, 2008, 10 pages.

(56) References Cited

OTHER PUBLICATIONS

Bowman, "A Passive Capture Latch for Odyssey-Class AUVs," Technical Report WHOI-98-12, Woods Hole Oceanographic Institution, Jun. 1998, 91 pages.
Chao, "Autonomous Underwater Vehicles and Sensors Powered by Ocean Thermal Energy", ORE Seminar, Jan. 2016, 1 page.
Chao, "Thermal Recharging Battery for Underwater Instrumentations", Oct. 2013, 1 page.
Chao, "Diurnal Variability Part I: Global 1-km SST (G1SST) Part II:GHRSST-DV-Argo Obs. System", California Institute of Technology, Feb. 2011, 19 pages.
Cowen, "Flying Plug: A Small UUV Designed for Submarine Data Connectivity (U)," 1997, 21 pages.
Daley, "Hydraulic Generator Drive Robust Control", IFPE 2014, Paper 9.1, Mar. 2014, 4 pages.
Di Cadilhac, "Docketing System," 2003, pp. 93-108.
Gish, "Design of an AUV Recharging System," Massachusetts Institute of Technology, 2004, 134 pages.
Griffiths, "Technology and Applications of Autonomous Underwater Vehicles," 2003, pp. 93-108.
Hardy et al., "Unmanned Underwater Vehicle (UUV) deployment and retrieval considerations for submarines," Paper on UUV Development and Retrieval Options for Submarines, BMT Defense Services Ltd., Apr. 2008, pp. 1-15.
Huntsberger et al., "Advanced Energy Storage System for Thermal Engines", California Institute of Technology, Jan. 2013, 16 pages.
Huntsberger et al., "Slocum-TREC Thermal Glider", California Institute of Technology, Jan. 2012, 16 pages.
"HG Hydraulic Generator", Dynaset, Sep. 2016, 5 pages.
"Hydraulic Electrical Generating Systems", Eaton Aerospace Group, Form No. TF500-6B, Jun. 2013, 4 pages.
"Hydraulic Motors", Dayton Lamina Corp., Form 029-3, May 2013, 8 pages.
Jones et al., "Novel Thermal Powered Technology for UUV Persistant Surveillance", California Institute of Technology, Feb. 2006, 11 pages.
McGee et al., "Free Piston Hydraulic Pump", Berkeley Robotics & Human Engineering Laboratory, Sep. 2016, 4 pages.
Mosca et al., "Low-Frequency Acoustic Source for AUV Long-Range Communication", iXSea, Jul. 2013, 9 pages.
NASA, "Utilizing Ocean Thermal Energy in a Submarine Robot", NASA's Jet Propulsion Laboratory, NASA Tech Briefs NPO-43304, Dec. 2008, 4 pages.
Shimura et al., "Long-range time reversal communication in deep water: Experimental Results", J. Acoust. Soc. Am. 132 (1), Jun. 2012, 5 pages.
Singh et al., "AOSN MURI: Docketing for an Autonomous Ocean Sampling Network," Program #: ONR-322 OM/AOSN N00014-95-1-13166, 1998, 6 pages.
Singh et al., "Docketing for an Autonomous Ocean Sampling Network," IEEE Journal of Oceanic Engineering, vol. 26, No. 4, Oct. 2001, pp. 498-514.
Swean, Jr., "ONR Unmanned Sea Vehicle Technology Development, Auvsi's Unmanned Systems Program Review 2008", Feb. 2008, 34 pages.
Vandenberg, "Manning and Maintainability of a Submarine Unmanned Undersea Vehicle (UUV) Program: A Systems Engineering Case Study," Thesis, Naval Postgraduate School, Sep. 2010, 137 pages.
Office Action dated Dec. 24, 2020 in connection with U.S. Appl. No. 15/725,538, 17 pages.
Communication under Rule 71(3) EPC dated Nov. 3, 2020 in connection with European Patent Application No. 17749575.1, 26 pages.
Decision to Refuse dated Oct. 13, 2020 in connection with Japanese Patent Application No. 2018-546519, 6 pages.
Decision of Refusal dated Oct. 13, 2020 in connection with Japanese Patent Application No. 2018-546519, 6 pages.
Office Action dated Aug. 25, 2020 in connection with U.S. Appl. No. 16/384,012, 6 pages.
International Search Report and Written Opinion of the International Searching Authority in connection with International Patent Application No. PCT/US2020/032057 dated Aug. 4, 2020, 8 pages.
Office Action dated Mar. 3, 2020 in connection with Japanese Patent Application No. 2018-546519, 7 pages.

\* cited by examiner

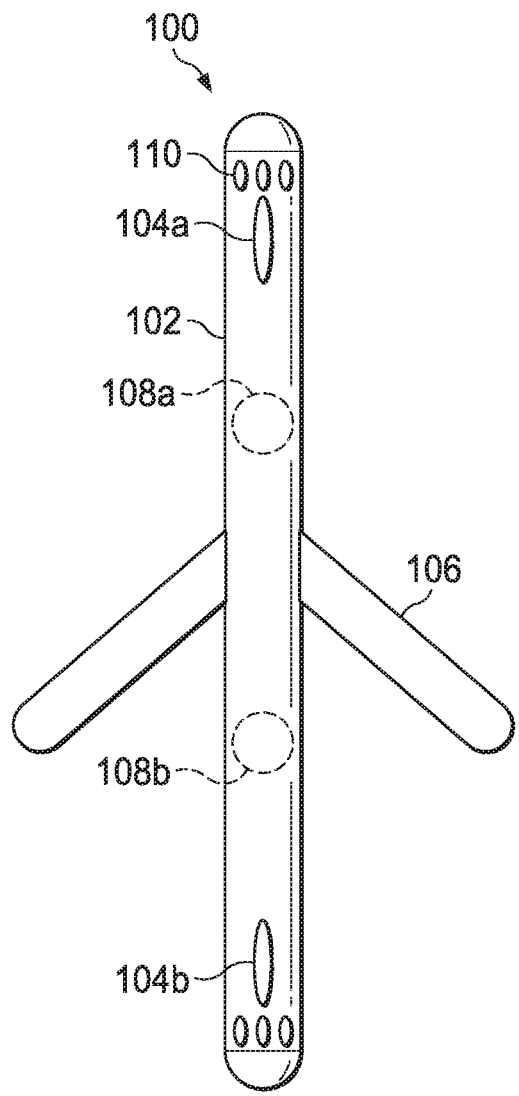
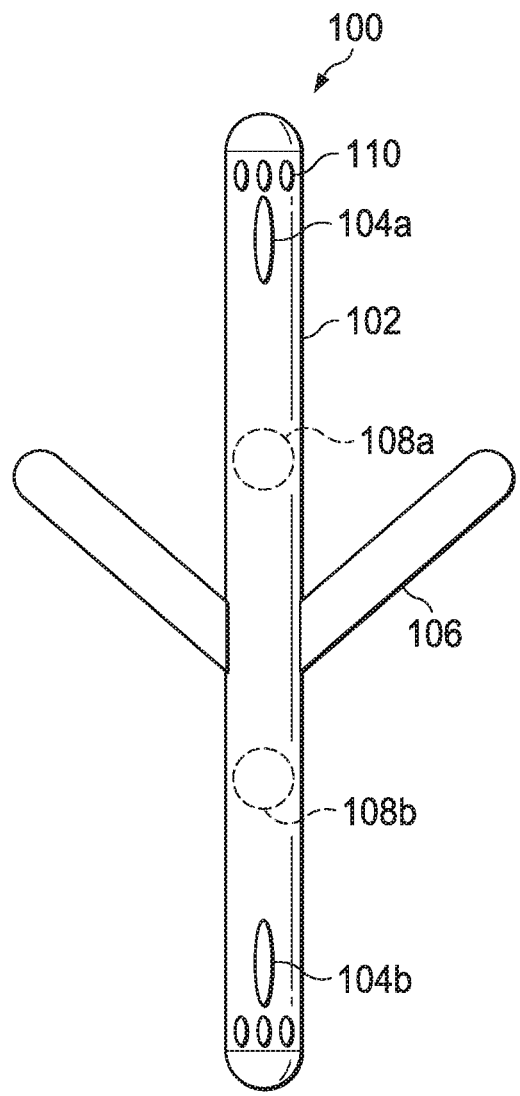
FIG. 1A         FIG. 1B
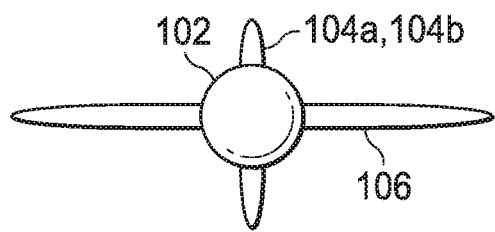
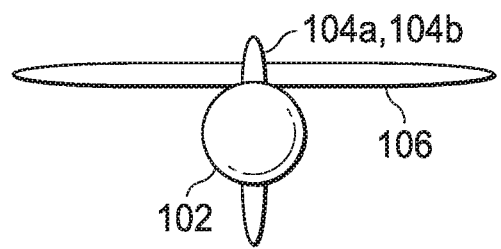
FIG. 1C         FIG. 1D

POWER GENERATION SYSTEMS BASED ON THERMAL DIFFERENCES USING SLOW-MOTION HIGH-FORCE ENERGY CONVERSION

TECHNICAL FIELD

This disclosure generally relates to power generation systems that are based on thermal differences. More specifically, this disclosure relates to power generation systems based on thermal differences using slow-motion high-force energy conversion.

BACKGROUND

Unmanned underwater vehicles (UUVs) can be used in a number of applications, such as undersea surveying, recovery, or surveillance operations. However, supplying adequate power to UUVs for prolonged operation can be problematic. For example, one prior approach simply tethers a UUV to a central power plant and supplies power to the UUV through the tether. However, this clearly limits the UUV's range and deployment, and it can prevent the UUV from being used in situations requiring independent or autonomous operation. Another prior approach uses expanding wax based on absorbed heat to generate power, but this approach provides power in very small amounts, typically limited to less than about 200 Watts (W) at a 2.2 Watt-hour (WHr) capacity. Yet another prior approach involves using fuel cells in a UUV to generate power, but fuel cells typically require large packages and substantial space.

SUMMARY

This disclosure provides power generation systems based on thermal differences using slow-motion high-force energy conversion.

In a first embodiment, an apparatus includes first and second tanks each configured to receive and store a refrigerant under pressure. The apparatus also includes a cylinder defining a space configured to receive the refrigerant from the first and second tanks. The apparatus further includes a piston passing into the cylinder and having a head, where the head divides the space within the cylinder into a first volume for the refrigerant from the first tank and a second volume for the refrigerant from the second tank. In addition, the apparatus includes a converter configured to translate linear movement of the piston into rotational motion and a generator configured to produce electrical power based on the rotational motion.

In a second embodiment, a system includes a vehicle having a body and a power generation system. The power generation system includes first and second tanks each configured to receive and store a refrigerant under pressure. The power generation system also includes a cylinder defining a space configured to receive the refrigerant from the first and second tanks. The power generation system further includes a piston passing into the cylinder and having a head, where the head divides the space within the cylinder into a first volume for the refrigerant from the first tank and a second volume for the refrigerant from the second tank. In addition, the power generation system includes a converter configured to translate linear movement of the piston into rotational motion and a generator configured to produce electrical power based on the rotational motion.

In a third embodiment, a method includes creating flows of refrigerant between first and second tanks and first and second volumes of a cylinder. Each of the first and second tanks is configured to receive and store the refrigerant under pressure, and the cylinder defines a space configured to receive the refrigerant from the first and second tanks. The method also includes moving a piston passing into the cylinder and having a head, where the head divides the space within the cylinder into a first volume for the refrigerant from the first tank and a second volume for the refrigerant from the second tank. The method further includes translating linear movement of the piston into rotational motion and producing electrical power based on the rotational motion.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 1A through 1D illustrate a first example underwater vehicle that supports power generation based on thermal differences using slow-motion high-force energy conversion in accordance with this disclosure;

DETAILED DESCRIPTION

Figure 2A:
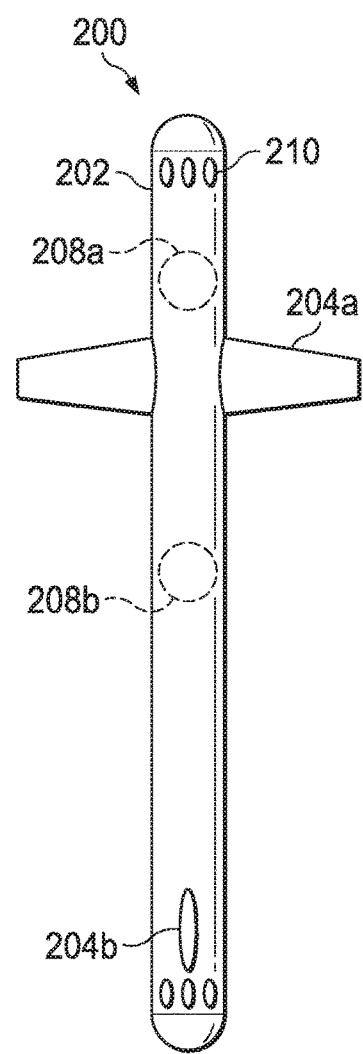
FIGS. 2A through 2C illustrate a second example underwater vehicle that supports power generation based on thermal differences using slow-motion high-force energy conversion in accordance with this disclosure.

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

It should be noted that, in the following description, it is assumed underwater vehicles supporting power generation based on thermal differences using slow-motion high-force energy conversion can dive and perform other functions in a body of water. However, this need not be the case. Other systems can be used that support power generation based on thermal differences using slow-motion high-force energy conversion without requiring operation of a vehicle at different underwater depths. For example, underwater vehicles, remote underwater power sources, or other systems may constantly remain at or near the surface of a body of water, at or near an underwater thermal vent, or in other locations while supporting power generation based on thermal differences using slow-motion high-force energy conversion. Thus, while the following description describes specific underwater vehicles that support power generation, the power generation systems described in this patent document are not limited to use with these specific underwater vehicles or even to underwater vehicles in general.

FIGS. 1A through 1D illustrate a first example underwater vehicle 100 that supports power generation based on thermal differences using slow-motion high-force energy conversion in accordance with this disclosure. In particular, FIGS. 1A and 1B illustrate the underwater vehicle 100 in different modes of operation, and FIGS. 1C and 1D illustrate alternate positions for certain components of the underwater vehicle 100. In this example, the vehicle 100 represents an unmanned underwater vehicle or other device that can function as both a buoy and a glider within an ocean or other body of water. The vehicle 100 can be used to support various functions, such as undersea surveying, recovery, or surveillance operations.

As shown in FIGS. 1A and 1B, the vehicle 100 includes a body 102 having fins 104a-104b and wings 106. The body 102 represents any suitable structure configured to encase, protect, or otherwise contain other components of the vehicle 100. The body 102 can be formed from any suitable material(s) and in any suitable manner. As a particular example, the body 102 may include a neutrally-buoyant composite of G10 fiberglass or other material coated with protective ultraviolet paint. The body 102 can be formed so that the vehicle 100 is able to withstand extremely elevated pressures found at deep depths in an ocean or other body of water. In some embodiments, the body 102 can allow the vehicle 100 to operate at depths of up to 1,000 meters or more.

The fins 104a-104b represent projections from the body 102 that help to stabilize the body 102 during travel. Each of the fins 104a-104b can be formed from any suitable material(s) and in any suitable manner. As a particular example, each of the fins 104a-104b may include a neutrally-buoyant composite of G10 fiberglass or other material coated with protective ultraviolet paint. Also, each of the fins 104a-104b can have any suitable size, shape, and dimensions. Further, at least some of the fins 104a-104b can be movable or adjustable to help alter the course of the body 102 and to steer the body 102 through water during travel. In addition, the numbers and positions of the fins 104a-104b shown here are examples only, and any numbers and positions of fins can be used to support desired operations of the vehicle 100.

In some embodiments, the underwater vehicle 100 can both ascend and descend within a body of water during use. In these embodiments, the fins 104a can be used to steer the vehicle 100 while ascending, and the fins 104b can be used to steer the vehicle 100 while descending. Moreover, when the vehicle 100 is ascending, the fins 104a can be used to control the pitch of the vehicle 100, and a differential between the fins 104a can be used to control the roll of the vehicle 100. Similarly, when the vehicle 100 is descending, the fins 104b can be used to control the pitch of the vehicle 100, and a differential between the fins 104b can be used to control the roll of the vehicle 100.

The wings 106 support gliding movement of the vehicle 100 underwater. For example, in some instances, the vehicle 100 can be placed into a body of water and programmed to travel short or long distances to reach desired destinations. When traveling, the vehicle 100 can be positioned generally horizontal, and the wings 106 help to enable the vehicle 100 to travel short or long distances using reduced or minimal amounts of energy. Once in a desired location, the wings 106 can be stowed or used when the vehicle 100 ascends or descends. The wings 106 are also moveable to support different directions of travel. For example, the wings 106 are swept downward in FIG. 1A when the vehicle 100 is ascending, and the wings 106 are swept upward in FIG. 1B when the vehicle 100 is descending. In this way, the wings 106 help to facilitate easier or more rapid movement of the vehicle 100 while ascending or descending.

Each of the wings 106 can be formed from any suitable material(s) and in any suitable manner. As a particular example, each of the wings 106 may include a neutrally-buoyant composite of G10 fiberglass or other material coated with protective ultraviolet paint. Also, each of the wings 106 can have any suitable size, shape, and dimensions. In addition, the number and positions of the wings 106 shown here are examples only, and any number and positions of wings can be used to support desired operations of the vehicle 100.

The underwater vehicle 100 may further include one or more ballasts 108a-108b, which help to control the center of gravity of the vehicle 100. As described in more detail below, material (such as carbon dioxide or other refrigerant in tanks) can move within a power supply or other portion of the vehicle 100, and that movement can alter the center of gravity of the vehicle 100. Underwater gliders can be particularly susceptible to changes in their centers of gravity, so the vehicle 100 can adjust one or more of the ballasts 108a-108b as needed or desired (such as during ascent, descent, or horizontal travel) to maintain the center of gravity of the vehicle 100 substantially at a desired location. The adjustment can be made along the long axis of the vehicle 100 so as to balance the pitch of the vehicle 100 during ascent, descent, or horizontal travel.

Each ballast 108a-108b includes any suitable structure configured to modify the center of gravity of an underwater vehicle. As an example, each ballast 108a-108b can include a mass that is moved using a lead screw and a motor or other mechanism. As a particular example, a ballast capable of operation at depths of 1,000 meters or more while acting as a pitch trim and moving a 100 gram mass can be used. Other implementations of each ballast 108a-108b can include use of a displacement piston pump or conventional approaches for pumping water into and out of a ballast tank. Note that the number and positions of the ballasts 108a-108b shown here are examples only, and any number and positions of ballasts can be used in the vehicle 100.

In some embodiments, various flood ports 110 can be used to allow water to flow into portions of an interior of the body 102. As described in more detail below, water of different temperatures may be used to heat/cool different tanks of refrigerant that are used in the generation of electrical power. For example, the flood ports 110 may allow warmer water to enter into an internal compartment around one tank to increase the temperature of that tank. Other flood ports 110 may allow colder water to enter into another internal compartment around another tank to decrease the temperature of that tank. The thermal difference between the tanks can create a pressure differential that is used to produce electrical power. Each flood port 110 includes any suitable structure configured to selectively allow water to enter or exit an interior of the body 102.

FIGS. 1C and 1D illustrate different alternate end views of the underwater vehicle 100. In FIG. 1C, the wings 106 are positioned and extend from the body 102 along a line through a center of the body 102. In FIG. 1D, the wings 106 are positioned and extend from the body 102 along a line tangential to the body 102. Either of these positions can be used for the wings 106 in FIGS. 1A and 1B. In either case, the wings 106 can be stowed in a folded position where the wings 106 extend along the length of the body 102 and later unfolded before, during, or after deployment. Stowing the wings 106 along the length of the body 102 allows the vehicle 100 to convert to a buoy-type mode of operation, such as after transit to desired locations (where, during transit, the wings 106 can be deployed as shown in FIGS. 1A and 1B). The fins 104a-104b can also be utilized in periodic ascents and descents to maneuver the vehicle 100 in order to maintain geographic position.

Figure 2B:
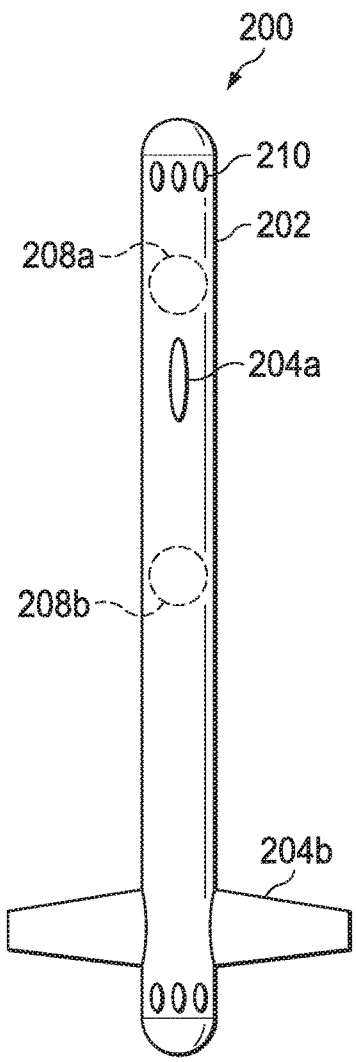
Figure 2C:
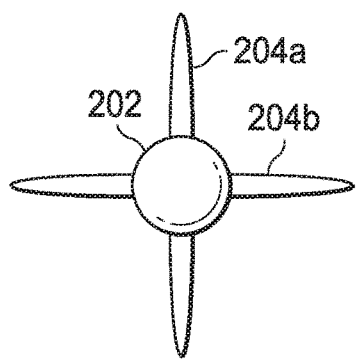

FIGS. 2A through 2C illustrate a second example underwater vehicle 200 that supports power generation based on thermal differences using slow-motion high-force energy conversion in accordance with this disclosure. In this example, the vehicle 200 represents an unmanned underwater vehicle or other device that can function as a buoy within an ocean or other body of water. The vehicle 200 can be used to support various functions, such as undersea surveying, recovery, or surveillance operations.

As shown in FIGS. 2A through 2C, the underwater vehicle 200 includes a body 202 and fins 204a-204b. The body 202 represents any suitable structure configured to encase, protect, or otherwise contain other components of the vehicle 200. The body 202 can be formed from any suitable material(s), such as a neutrally-buoyant composite of G10 fiberglass or other material coated with protective ultraviolet paint, and in any suitable manner. The fins 204a-204b represent projections from the body 202 that help to stabilize the body 202 during travel. Each of the fins 204a-204b can be formed from any suitable material(s), such as a neutrally-buoyant composite of G10 fiberglass or other material coated with protective ultraviolet paint, and in any suitable manner. Also, each of the fins 204a-204b can have any suitable size, shape, and dimensions. Further, at least some of the fins 204a-204b can be movable or adjustable to help alter the course of the body 202 and to steer the body 102 through water during travel. In addition, the numbers and positions of the fins 204a-204b shown here are examples only, and any numbers and positions of fins can be used to support desired operations of the vehicle 200. The fins 204a-204b can be utilized in periodic ascents and descents to maneuver the vehicle 200 in order to maintain geographic position.

The vehicle 200 may further include one or more ballasts 208a-208b, which help to control the center of gravity of the vehicle 200. Each ballast 208a-208b can, for instance, include a mass that is moved using a lead screw and a motor or other mechanism, a displacement piston pump, or a ballast tank. In addition, the vehicle 200 may include various flood ports 210, which can be used to allow water to flow into portions of an interior of the body 202 in order to heat/cool different tanks of refrigerant that are used in the generation of electrical power.

As can be seen in FIGS. 2A through 2C, the underwater vehicle 200 lacks wings used to support gliding of the vehicle 200 through water. As a result, the vehicle 200 represents a device that can function as a buoy but generally not as a glider within an ocean or other body of water. In some embodiments, the underwater vehicle 200 can function similar to a hydrometer and need not include any fins. In these embodiments, the underwater vehicle 200 can simply reside at the surface of a body of water and need not travel up and down across a wide range of depths.

As described in more detail below, each of the underwater vehicles 100, 200 includes a power generation system that operates based on flows of refrigerant into and out of multiple tanks. The tanks have a temperature differential (or a temperature-based pressure differential) that facilitates movement of the refrigerant into and out of the tanks. The movement of the refrigerant causes at least one generator to generate electrical power, which can be used immediately or stored for later use. Various approaches may be used to achieve a satisfactory temperature or pressure differential between the tanks. For instance, in some embodiments, each underwater vehicle 100, 200 may be designed to operate at different underwater depths, such as at or near the surface down to 1,000 meters or more, and water of different temperatures may be captured or otherwise used to heat/cool different tanks. In other embodiments, each underwater vehicle 100, 200 may be designed to operate in a location where different tanks can be heated/cooled at the same time, such as at or near an underwater thermal vent.

Moreover, the power generation system in each underwater vehicle 100, 200 may use slow-motion high-force energy conversion in order to generate electrical power. For example, the refrigerant in the tanks may be used to cause movement of a piston back and forth within a hydraulic cylinder or other structure. The piston can be coupled to a chain drive, ball screw, or other structure that translates the linear movement of the piston into rotational motion of a generator. A chain drive and a ball screw are examples of devices that can be used to convert the slow-motion but high-force energy generated by the movement of the refrigerant into electrical power. A gearbox can also be used to translate the slower movement of the piston into more rapid rotation of the generator.

The ability to generate electrical power based on temperature/pressure differences between refrigerant in tanks using slow-motion high-force energy conversion provides various advantages depending on the implementation and vehicle use. For example, the power generation systems may be used to generate a relatively large amount of electrical power in these types of applications. In some embodiments, for instance, a power generation system using about five to ten kilograms of carbon dioxide ($CO_2$) as a refrigerant may be used to generate about 1 kilo-Watts (kW) of continuous power at an about 25 to 100 Watt-hour (WHr) capacity. A power generation system using about twenty kilograms of carbon dioxide as a refrigerant may be used to generate about 1 kW of continuous power at an about 200 to 400 WHr capacity. Of course, these specific values are examples only and can vary based on a number of factors. Also, the use of the chain drive, ball screw, or other slow-motion high-force energy conversion system can help to provide more efficient operation of a power generation system with fewer losses (such as reduced friction losses). This can help to increase or maximize the amount of electrical power that can be generated in the power generation system. In some cases, this may allow adequate power to be generated even when there is a relatively small temperature differential between the refrigerant in the tanks (such as a temperature differential as small as about 10° C.). Further, the power generation systems may have a fewer number of components and a reduced size/weight compared to other power generation systems, which can be beneficial in various applications. In addition, the ability to support slow-motion high-force energy conversion helps to prevent large forces and side motions from damaging components like conventional rack and pinion drives.

The power generation systems and the associated vehicles disclosed in this patent document can find use in a number of applications. For example, the power generation systems can be used in floats, gliders, or other ocean-based or sea-based vehicles used for environmental monitoring, marine life monitoring, commercial or military monitoring or patrols, and border or law enforcement monitoring or patrols. As a particular example, the power generation systems can be used in ARGO floats or other systems used to measure temperature, salinity, or other features of the upper oceans of the world.

Although FIGS. 1A through 2C illustrate examples of underwater vehicles 100 and 200 that support power generation based on thermal differences using slow-motion high-force energy conversion, various changes may be made to FIGS. 1A through 2C. For example, these figures illustrate example underwater vehicles only, and power generation systems based on thermal differences using slow-motion high-force energy conversion described in this patent document can be used in any other suitable device or system.

Figure 3:
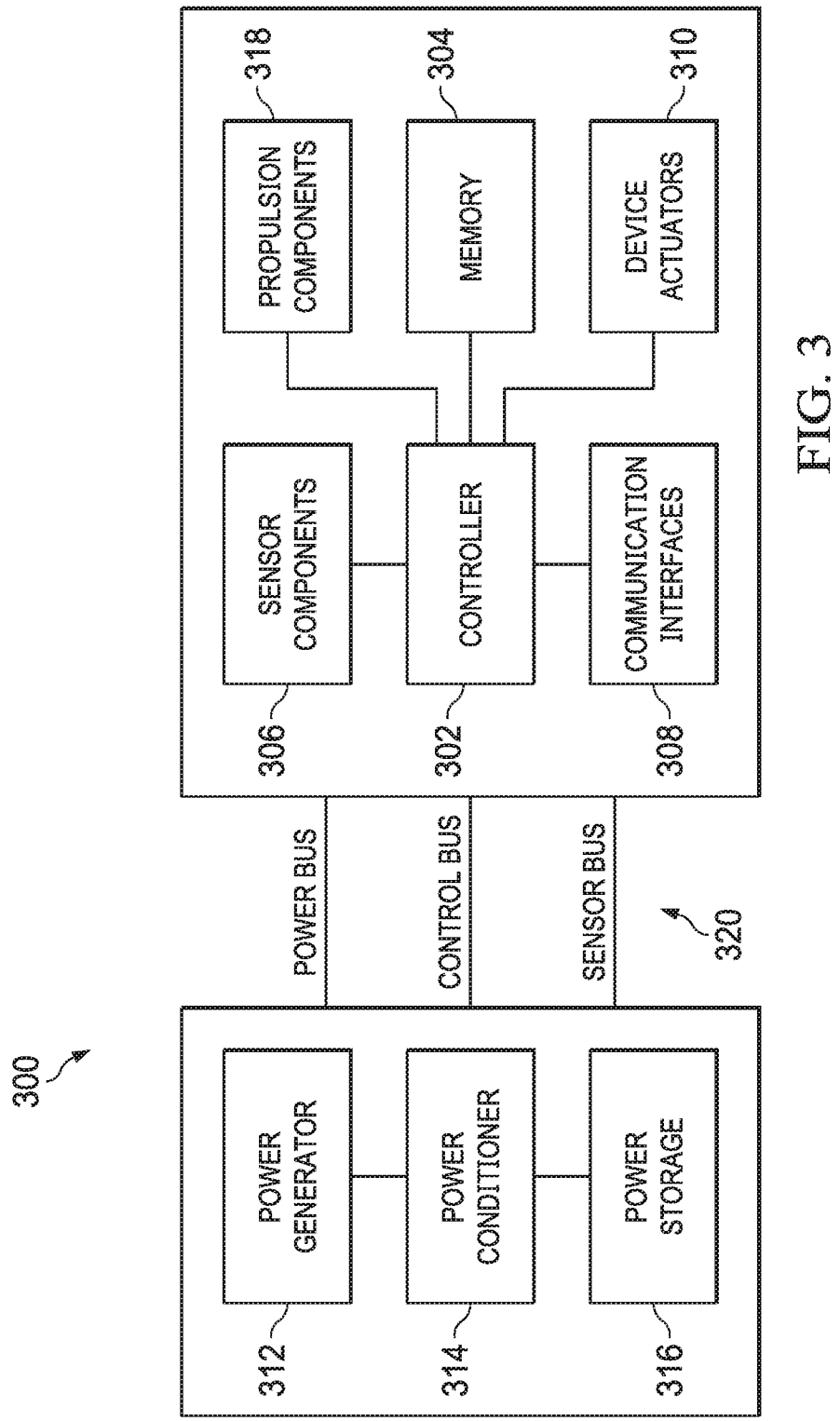
FIG. 3 illustrates example components of an underwater vehicle that supports power generation based on thermal differences using slow-motion high-force energy conversion in accordance with this disclosure.

FIG. 3 illustrates example components of an underwater vehicle 300 that supports power generation based on thermal differences using slow-motion high-force energy conversion in accordance with this disclosure. The underwater vehicle 300 can, for example, represent either of the underwater vehicles 100 and 200 described above. The components shown in FIG. 3 can therefore represent internal or other components within either of the vehicles 100 and 200 that were not shown in FIGS. 1A through 2C.

As shown in FIG. 3, the vehicle 300 includes at least one controller 302 and at least one memory 304. The controller 302 controls the overall operation of the vehicle 300 and can represent any suitable hardware or combination of hardware and software/firmware for controlling the vehicle 300. For example, the controller 302 can represent at least one processor configured to execute instructions obtained from the memory 304. The controller 302 may include any suitable number(s) and type(s) of processors or other computing or control devices in any suitable arrangement. Example types of controllers 302 include microprocessors, microcontrollers, digital signal processors, field programmable gate arrays, application specific integrated circuits, and discrete circuitry.

The memory 304 stores data used, generated, or collected by the controller 302 or other components of the vehicle 300. Each memory 304 represents any suitable structure(s) configured to store and facilitate retrieval of information (such as data, program code, and/or other suitable information on a temporary or permanent basis). Some examples of the memory 304 can include at least one random access memory, read only memory, Flash memory, or any other suitable volatile or non-volatile storage and retrieval device(s).

The vehicle 300 in this example also includes one or more sensor components 306 and one or more communication interfaces 308. The sensor components 306 include sensors that can be used to sense any suitable characteristics of the vehicle 300 itself or the environment around the vehicle 300. For example, the sensor components 306 can include a position sensor, such as a Global Positioning System (GPS) sensor, which can identify the position of the vehicle 300. This can be used, for instance, to help make sure that the vehicle 300 is following a desired path or is maintaining its position at or near a desired location. The sensor components 306 can also include pressure sensors used to estimate a depth of the underwater vehicle 300. The sensor components 306 can further include audio sensors for capturing audio signals, photodetectors or other cameras for capturing video signals or photographs, or any other or additional components for capturing any other or additional information. Each sensor component 306 includes any suitable structure for sensing one or more characteristics.

The communication interfaces 308 support interactions between the vehicle 300 and other devices or systems. For example, the communication interfaces 308 can include at least one radio frequency (RF) or other transceiver configured to communicate with one or more satellites, airplanes, ships, or other nearby or distant devices. The communication interfaces 308 allow the vehicle 300 to transmit data to one or more external destinations, such as information associated with data collected by the sensor components 306. The communication interfaces 308 also allow the vehicle 300 to receive data from one or more external sources, such as instructions for other or additional operations to be performed by the vehicle 300 or instructions for controlling where the vehicle 300 operates. Each communication interface 308 includes any suitable structure(s) supporting communication with the vehicle 300.

The vehicle 300 may include one or more device actuators 310, which are used to adjust one or more operational aspects of the vehicle 300. For example, the device actuators 310 can be used to move the fins 104a-104b, 204a-204b of the vehicle while the vehicle is ascending or descending. As a particular example, the device actuators 310 can be used to move the fins 104a-104b, 204a-204b during ascent or descent of the vehicle so that the vehicle obtains a desired attitude with respect to the Earth's magnetic field (in order to achieve a desired descent or ascent path). The device actuators 310 can also be used to control the positioning of the wings 106 to control whether the wings 106 are stowed or swept upward or downward (depending on the direction of travel). Each device actuator 310 includes any suitable structure for physically modifying one or more components of an underwater vehicle. Note, however, that the vehicle 300 need not include device actuators 310, such as when the vehicle 300 lacks fins or wings.

The vehicle 300 further includes a power generator 312, a power conditioner 314, and a power storage 316. The power generator 312 generally operates to create electrical energy. In particular, the power generator 312 can operate based on thermal differences and can use slow-motion high-force energy conversion as described in more detail below. The power generator 312 includes any suitable structure configured to generate electrical energy based on thermal differences.

The power conditioner 314 is configured to condition or convert the power generated by the power generator 312 into a suitable form for storage or use. For example, the power conditioner 314 can receive a direct current (DC) signal from the power generator 312, filter the DC signal, and store power in the power storage 316 based on the DC signal. The power conditioner 314 can also receive power from the power storage 316 and convert the power into suitable voltage(s) and current(s) for other components of the vehicle 300. The power conditioner 314 includes any suitable structure(s) for conditioning or converting electrical power.

The power storage 316 is used to store electrical power generated by the power generator 312 for later use. The power storage 316 represents any suitable structure(s) for storing electrical power, such as one or more batteries or super-capacitors.

The vehicle 300 may include one or more propulsion components 318, which represent components used to physically move the vehicle 300 in or through water. In some embodiments, the propulsion components 318 can represent one or more motors or other propulsion systems. In particular embodiments, the propulsion components 318 can be used only when the vehicle 300 is traveling between a position at or near the surface and a desired depth. During other time periods, the propulsion components 318 can be deactivated. Of course, the propulsion components 318 may be used at other times, such as to help maintain the vehicle 300 at a desired location or to help move the vehicle 300 to avoid observation or detection. In other embodiments, the propulsion components 318 can represent components used for buoyancy control and moment and attitude control, where changes in buoyance cause the vehicle 300 to ascend and descend and changes in moment/attitude help to reposition the vehicle 300 during ascent or descent (such as by allowing up to 30° or other angle of travel during ascent or descent). The ability to use buoyancy changes may allow the vehicle 300 to capture water of different temperatures for use in power generation using little stored energy. Note, however, that the vehicle 300 need not include propulsion components 318, such as when the vehicle 300 represents a passive buoy.

Various buses 320 can be used to interconnect components of the vehicle 300. For example, a power bus can transport power to various components of the vehicle 300. The power generated by the power generator 312 and the power stored in the power storage 316 can be supplied to any of the components in FIG. 3. For instance, electrical power can be provided to the controller 302 and memory 304 to facilitate computations and instruction execution by the controller 302 and data storage/retrieval by the memory 304. Electrical power can also be provided to the sensor components 306, communication interfaces 308, and device actuators 310 in order to support sensing, communication, and actuation operations. In addition, electrical power can be provided to the propulsion components 318 in order to support movement of the vehicle 300. The power bus may have a range of voltages and purposes, such as 5V, 12V, and 24V main drive power for servos and other device actuators (such as ballasting). A control bus can transport control signals for various components, such as control signals generated by the controller 302. A sensor bus can transport sensor data for various components.

Although FIG. 3 illustrates one example of components of an underwater vehicle 300 that supports power generation based on thermal differences using slow-motion high-force energy conversion, various changes may be made to FIG. 3. For example, various components in FIG. 3 can be combined, further subdivided, rearranged, or omitted or additional components can be added according to particular needs.

Figure 4:
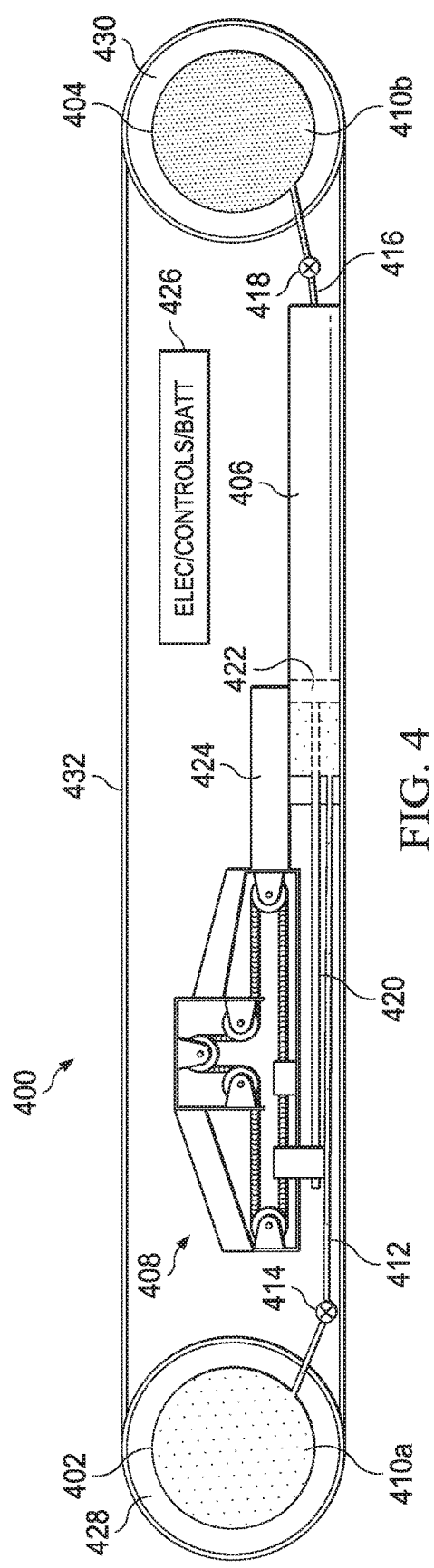
FIG. 4 illustrates a first example power generation system based on thermal differences using slow-motion high-force energy conversion in accordance with this disclosure.

FIG. 4 illustrates a first example power generation system 400 based on thermal differences using slow-motion high-force energy conversion in accordance with this disclosure. The power generation system 400 may, for example, represent or form a part of the power generator 312 described above and be used in the underwater vehicle 100 or 200 described above. Note, however, that the power generation system 400 may be used in any other suitable vehicle or other system in order to generate power.

As shown in FIG. 4, the power generation system 400 generally includes a first tank 402, a second tank 404, a cylinder 406, and a slow-motion high-force energy conversion system 408. The first and second tanks 402 and 404 are respectively configured to hold a refrigerant 410a and 410b under pressure. The refrigerant 410a can flow into and out of the first tank 402 and into and out of a first portion of the cylinder 406. Similarly, the refrigerant 410b can flow into and out of the second tank 404 and into and out of a second portion of the cylinder 406. Differences in pressure between the refrigerant 410a-410b (which may be caused by thermal differences) in the tanks 402 and 404 can determine whether the refrigerant 410a flows into the first tank 402 or the cylinder 406 and whether the refrigerant 410b flows into the second tank 404 or the cylinder 406. Each tank 402 and 404 includes any suitable structure configured to hold a refrigerant under pressure. The refrigerant 410a-410b includes any suitable fluid used to transfer heat between the tanks 402 and 404 and the cylinder 406, such as liquid carbon dioxide. Note that the tanks 402 and 404 may or may not hold the same refrigerant.

In this example, the first tank 402 is coupled to the cylinder 406 via a first fluid line 412, and a first valve 414 is configured to be selectively opened and closed to control the flow of the refrigerant 410a through the first fluid line 412 between the tank 402 and the cylinder 406. Similarly, the second tank 404 is coupled to the cylinder 406 via a second fluid line 416, and a second valve 418 is configured to be selectively opened and closed to control the flow of the refrigerant 410b through the second fluid line 416 between the tank 404 and the cylinder 406. Each fluid line 412 and 416 includes any suitable passageway configured to allow transport of a refrigerant between a tank and a cylinder. Each valve 414 and 418 includes any suitable structure configured to be opened and closed to control a flow of refrigerant.

The cylinder 406 generally defines a space in which the refrigerant 410a-410b from the tanks 402 and 404 can enter and exit. The cylinder 406 here has a large aspect ratio, meaning the length of the cylinder 406 is much larger than a width or diameter of the cylinder 406. The cylinder 406 may therefore be referred to as a "long throw" cylinder. The cylinder 406 includes any suitable structure defining a space configured to receive refrigerant from multiple tanks. Note that the cylinder 406 may have any suitable shape and may or may not have a circular cross-section.

A piston 420 extends into and out of the cylinder 406, and a head 422 of the piston 420 separates the internal space in the cylinder 406 into two distinct volumes. One volume is used to receive the refrigerant 410a from the first tank 402, and the other volume is used to receive the refrigerant 410b from the second tank 404. As described below, the sizes of these volumes vary as the refrigerant 410a-410b moves into and out of the cylinder 406. A seal around the head 422 of the piston 420 generally prevents the refrigerant 410a or 410b in one volume from leaking into the other volume (and vice versa). This helps to ensure that a pressure differential between the refrigerant 410a-410b moves the piston 420. Also, a seal at one end of the cylinder 406 allows passage of the piston 420 through that end of the cylinder 406 while preventing leakage of the refrigerant 410a out of the cylinder 406. The piston 420 includes any suitable structure configured to move back and forth within a cylinder based on refrigerant flow into and out of the cylinder. Also, any suitable seals can be used with the cylinder 406 and the piston 420, such as polytetrafluoroethylene (PTFE) seals or other polymer seals.

The energy conversion system 408 generally operates to convert the force created by the piston 420 based on the movement of the refrigerant 410a-410b into and out of the cylinder 406 into electrical power. In some embodiments, the force on the piston 420 created by the refrigerant 410*a*-410*b* can be quite large. As a particular example, a force of about 300 to 500 pounds per square inch (about 2068.4 to 3447.4 kilopascals) may be applied to a piston head 422 of about 12 square inches (about 77.4 square centimeters) in area, resulting in about 3,600 to 6,000 pounds of force being applied against the piston 420. However, the piston 420 moves relatively slowly due to various resistance forces (such as resistance forces associated with a speed-increasing gearbox and a generator described below) and friction forces. The energy conversion system 408 helps to convert this slow-motion but high-force energy into electrical power. The energy conversion system 408 also operates to convert the linear movement of the piston 420 into rotational movement that can used to drive an electrical power generator.

The energy conversion system 408 includes any suitable structure configured to convert slow-motion and high-force energy provided by a piston into electrical power. Example embodiments of the energy conversion system 408 are provided below and use a chain drive or a ball screw to convert the slow-motion and high-force energy into rotational motion for use by a generator that produces electrical power. One benefit of using structures such as a chain drive or a ball screw is that these structures can often withstand high linear forces without damage and can provide large side motion tolerances.

Note that the cylinder 406 and the piston 420 can be sized to provide a desired amount of back-and-forth movement in order to support a desired amount of power generation in the system 400. For example, the cylinder 406 may have a length of about four to six feet (about 1.2 to 1.8 meters). The piston 420 can also have a similar length or be longer or shorter as needed to allow movement of the piston 420 along at least a substantial portion of the cylinder 406.

In this particular example, a support structure 424 can be used to rigidly couple the cylinder 406 to the energy conversion system 408. This helps to ensure that motion of the piston 420 substantially couples into the energy conversion system 408 (rather than causing relative motion of the cylinder 406 with respect to the energy conversion system 408 that does not generate electrical power). The support structure 424 includes any suitable structure facilitating rigid coupling of a cylinder and an energy conversion system. Note, however, that the use of a support structure 424 coupling the cylinder 406 and the energy conversion system 408 is not required and that other mechanisms can be used to secure the cylinder 406 and the energy conversion system 408. For instance, the cylinder 406 and the energy conversion system 408 may both be coupled to one or more other structures (such as a housing or other support structure in an underwater vehicle) that can help to maintain the positions of the cylinder 406 and the energy conversion system 408.

A control unit 426 can be coupled to the energy conversion system 408 and used to control various aspects of the power generation system 400. For example, the control unit 426 may include electrical components used to receive electrical power from the energy conversion system 408 and to condition and store the electrical power in one or more batteries or other storage devices. The control unit 426 may also receive electrical power from the energy conversion system 408 or from the storage devices and condition the electrical power for use by other components of a larger device or system, such as other components of an underwater vehicle. In some embodiments, the control unit 426 may therefore include the power conditioner 314 and the power storage 316 described above. The control unit 426 may further control the generation of the electrical power, such as by controlling the operation of the valves 414 and 418.

To support power generation in the system 400, a pressure differential (such as a temperature-based pressure differential) can be created between the refrigerant **410*a*-410*b* in the tanks 402 and 404. This can be accomplished in various ways. For example, each tank 402 and 404 may have an associated insulating structure 428 and 430 that helps to maintain the temperature of the refrigerant 410*a*-410*b* in that tank 402 and 404. In some embodiments, the flood ports 110, 210 may be used to allow water of different temperatures to enter into the interior of a vehicle and soak the tanks 402 and 404 and the associated insulating structures 428 and 430 in order to heat/cool the refrigerant 410*a*-410*b* in the tanks 402 and 404. In other embodiments, the insulating structures 428 and 430 represent water jackets, each of which includes a structure configured to receive and retain water around the associated tank 402 or 404. One or more valves can be used to control the flow of water into and out of each water jacket, and a pump may optionally be provided to pull water into or push water out of each water jacket. In still other embodiments, one or more heat exchangers (not shown) may be associated with one or more of the tanks 402 and 404 and used to selectively heat/cool the refrigerant 410*a*-410*b* in the tank(s), and the insulating structures 428 and 430 may represent thermal insulation used to help maintain the temperatures inside the tanks 402 and 404**.

Depending on the implementation, different temperatures can be established in the tanks 402 and 404 in different ways to help create a pressure differential between the tanks 402 and 404. As one example, warmer water in one insulating structure 428 or 430 can be captured at or near the surface of a body of water, and colder water in another insulating structure 430 or 428 can be captured at a specified depth under the surface. As another example, water of different temperatures in the insulating structures 428 and 430 can be captured on different sides of a thermocline in a body of water. As yet another example, warmer water around a thermal vent, a portion of the thermal vent itself, or the ground around the thermal vent can be used to warm one tank 402 or 404, while colder water away from the thermal vent can be used to cool another tank 404 or 402. As still another example, water at the surface can be used to cool one tank 402 or 404, while surface air above the water, solar energy, or other mechanism can be used to warm another tank 404 or 402. As a final example, water at the surface can be used to warm one tank 402 or 404, while surface air above the water, radiative cooling, or other mechanism can be used to cool another tank 404 or 402. In general, any suitable technique or techniques can be used to heat and/or cool the refrigerant **410*a*-410*b***.

A housing 432 may be used to encase, protect, or otherwise contain other components of the power generation system 400. The housing 432 may represent a self-contained or other structure within an underwater vehicle or other larger device or system in which the power generation system 400 is used. The housing 432 may also represent the housing of the underwater vehicle or other larger device or system itself, such as when the housing 432 represents at least part of the body 102 or 202 of the underwater vehicle 100 or 200. The housing 432 can be formed from any suitable material(s) and in any suitable manner, and the housing 432 may have any suitable size, shape, and dimensions.

During a power generation cycle, a pressure differential is created between the tanks 402 and 404, such as by closing the valves 414 and 418 and exposing the refrigerant **410*a*-**

410b in the tanks 402 and 404 to different temperatures. Ideally, the refrigerant 410a or 410b in one tank 402 or 404 achieves a significantly higher pressure compared to the refrigerant 410b or 410a in the other tank 404 or 402. Prior to opening the valves 414 and 418, the head 422 of the piston 420 will generally be positioned such that (i) the volume in the cylinder 406 associated with the tank 402 or 404 having the higher-pressure refrigerant is smaller and (ii) the volume in the cylinder 406 associated with the tank 404 or 402 having the lower-pressure refrigerant is larger. To initiate power generation, the valves 414 and 418 are opened. At least some of the higher-pressure refrigerant exits its tank 402 or 404 and enters the cylinder 406. This and the lower pressure of the other tank pushes the head 422 of the piston 420 and causes at least some of the lower-pressure refrigerant to exit the cylinder 406 and enter its tank 404 or 402. As a result, the piston 420 moves in one direction, allowing the energy conversion system 408 to generate electrical power.

At some point (such as when the pressures in the tanks 402 and 404 are substantially equal), the valves 414 and 418 can be closed, which stops the transfer of refrigerant 410a-410b. At that point, the refrigerant 410a-410b in the tanks 402 and 404 can again be exposed to different temperatures, and another power generation cycle can occur. In some embodiments, however, the temperatures of the refrigerant 410a-410b in the tanks 402 and 404 can be reversed so that the piston 420 is driven in the opposite direction. In this way, it is possible to generate electrical power over repeated power generation cycles based on temperature-induced pressure differentials between the tanks 402 and 404.

Although FIG. 4 illustrates a first example of a power generation system 400 based on thermal differences using slow-motion high-force energy conversion, various changes may be made to FIG. 4. For example, the arrangement of the components shown in FIG. 4 is for illustration only. The tanks 402 and 404, cylinder 406, energy conversion system 408, or other components shown in FIG. 4 may be placed in any other suitable arrangement. As a particular example, both tanks 402 and 404 may be placed at the same end of the housing 432. Also, the relative sizes, shapes, and dimensions of the components shown in FIG. 4 are for illustration only.

Figure 5:
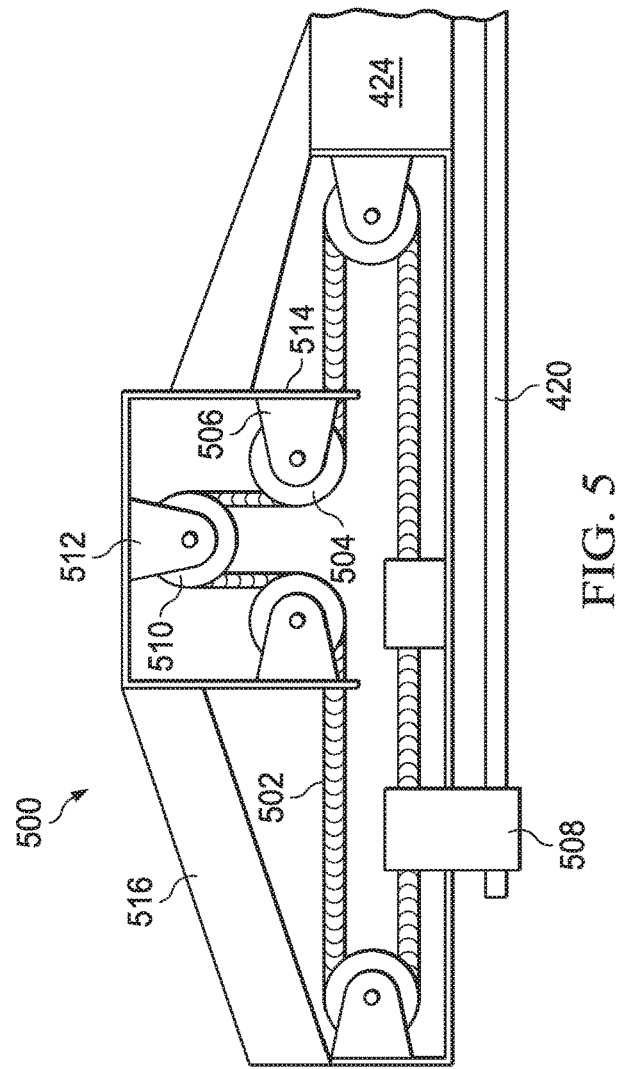
FIGS. 5 and 6 illustrate portions of an example slow-motion high-force energy conversion system in accordance with this disclosure.
Figure 6:
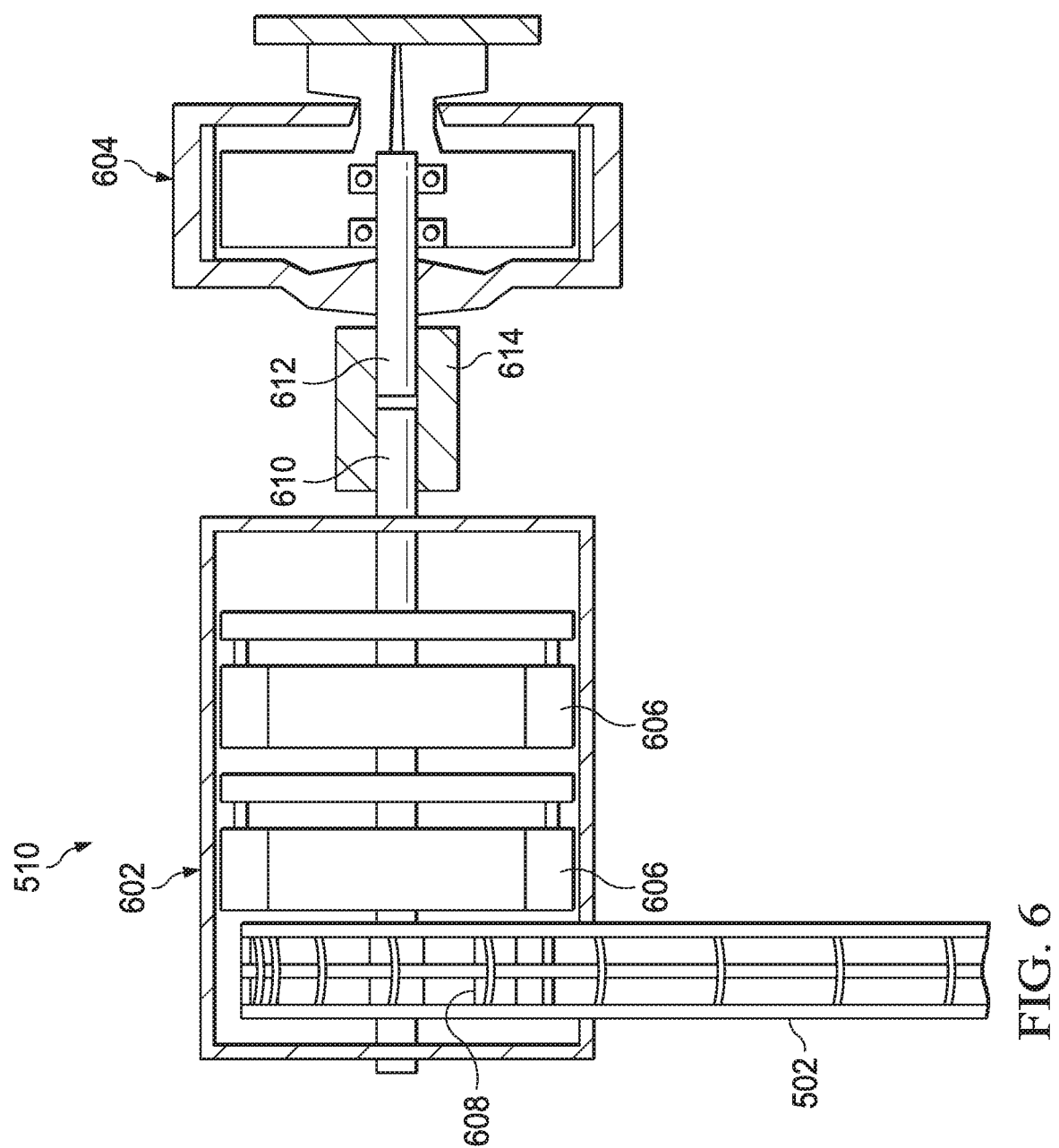

FIGS. 5 and 6 illustrate portions of an example slow-motion high-force energy conversion system 500 in accordance with this disclosure. The energy conversion system 500 may, for example, represent at least part of the energy conversion system 408 in the power generation system 400 of FIG. 4. Note, however, that the energy conversion system 500 may be used in any other suitable system.

As shown in FIG. 5, the energy conversion system 500 in this example is implemented using a chain drive system that includes a chain 502 routed around various pulleys 504, which are held in place by various mounts 506. The chain 502 represents any suitable chain, belt, or other continuous structure that can be routed as needed and rotated for power generation, such as a single-sprocket or multi-sprocket chain. The chain 502 can also be formed from any suitable material(s), such as metal or other chain links. Each pulley 504 represents any suitable structure configured to be partially encircled by and to route the chain 502. Each mount 506 represents any suitable structure configured to be mounted to a support and to retain a shaft that passes through a corresponding one of the pulleys 504. The chain 502 here is coupled to the piston 420 using a connector 508, which allows linear back-and-forth motion of the piston 420 to be converted into rotational back-and-forth motion of the chain 502. The connector 508 includes any suitable structure configured to couple a piston 420 and a chain 502.

The pulleys 504 here are used to route the chain 502 to a gearbox and generator system 510. A gearbox of the gearbox and generator system 510 translates the relatively slow rotational motion of the chain 502 into relatively high rotational motion. A generator of the gearbox and generator system 510 uses the relatively high rotational motion produced by the gearbox to produce electrical power. The gearbox generally includes any suitable gears or other structures for translating slower rotational motion into faster rotational motion, such as a two-stage or three-stage planetary gearbox or other gearbox that provides 10:1, 20:1, 50:1, 80:1, 100:1, or other speedup of rotational motion. The generator includes any suitable structure for producing electrical energy, such as a brushed or brushless DC generator. One example of the gearbox and generator system 510 is shown in FIG. 6, which is described below. The gearbox and generator system 510 can be held in place by a mount 512, which may be the same as or similar to the mounts 506.

In this example, some of the mounts 506 can be coupled to external structures, such as the support structure 424, and other mounts 506 and the mount 512 can be coupled to a rigid frame 514. The rigid frame 514 can be coupled to support or other components via one or more connecting arms 516. Here, the rigid frame 514 helps to ensure that the chain 502 can be routed securely around the gearbox and generator system 510. Note, however, that any other suitable techniques can be used to mount the components of the energy conversion system 500 in place.

As shown in FIG. 6, the gearbox and generator system 510 includes a gearbox 602 and an electrical generator 604. The gearbox 602 generally includes a multi-stage set of gears 606 that function as a high-efficiency high-torque-capable gear train and a sprocket 608. The chain 502 passes over the sprocket 608 and causes the sprocket 608 to rotate based on the rotation of the chain 502. The multi-stage set of gears 606 translates the relatively slow rotational movement of the chain 502/sprocket 608 into much higher rotational movement that is coupled into the electrical generator 604 via a shaft 610 of the gearbox 602 and a shaft 612 of the electrical generator 604. A shaft coupler 614 connects the shafts 610 and 612 so that the gearbox 602 is able to drive the electrical generator 604. As noted above, the gearbox 602 can support 10:1, 20:1, 50:1, 80:1, 100:1, or other speedup of rotational motion. Thus, for example, a rotational speed of 20 revolutions per minute (RPMs) of the sprocket 608 can be translated into a rotational speed of 200, 400, 1,000, 1,600, 2,000, or other RPMs of the shaft 612. Note, however, that the numbers of stages and gears 606 in the gearbox 602 and the speedup of rotational motion are for illustration only and that the gearbox 602 can have any other suitable design and operation.

The electrical generator 604 produces electrical power based on the rotation of its shaft 612 by the gearbox 602. In some cases, it may be necessary or desirable to provide assistance in providing starting torque for the electrical generator 604. This assistance can be provided in various ways. In some embodiments, for example, an electronic speed controller (ESC) can be momentarily connected to the electrical generator 604, such as via digital insulated-gate bipolar transistors (IGBTs), and then disconnected from the electrical generator 604 once the electrical generator 604 begins turning. As another example, the startup or run-up forces needed before the electrical generator 604 begins generating electrical energy can be reduced in various ways. For instance, the electrical generator 604 can initially be turned on as a motor, essentially pre-spinning the electrical generator 604. As another example, the electrical generator 604 might not be loaded until the gearbox 602 is spinning at least at some minimum speed, such as 50% of the gearbox's rated speed.

Although FIGS. 5 and 6 illustrate portions of one example of a slow-motion high-force energy conversion system 500, various changes may be made to FIGS. 5 and 6. For example, the routing of the chain 502 to the gearbox and generator system 510 shown in FIG. 5 is for illustration only, and other routing arrangements can be used to allow the chain 502 to be routed to the gearbox and generator system 510. Also, the specific gearbox 602 and electrical generator 604 shown in FIG. 6 are for illustration only. In addition, other embodiments of the energy conversion system 500 may operate without using a chain 502.

Figure 7:
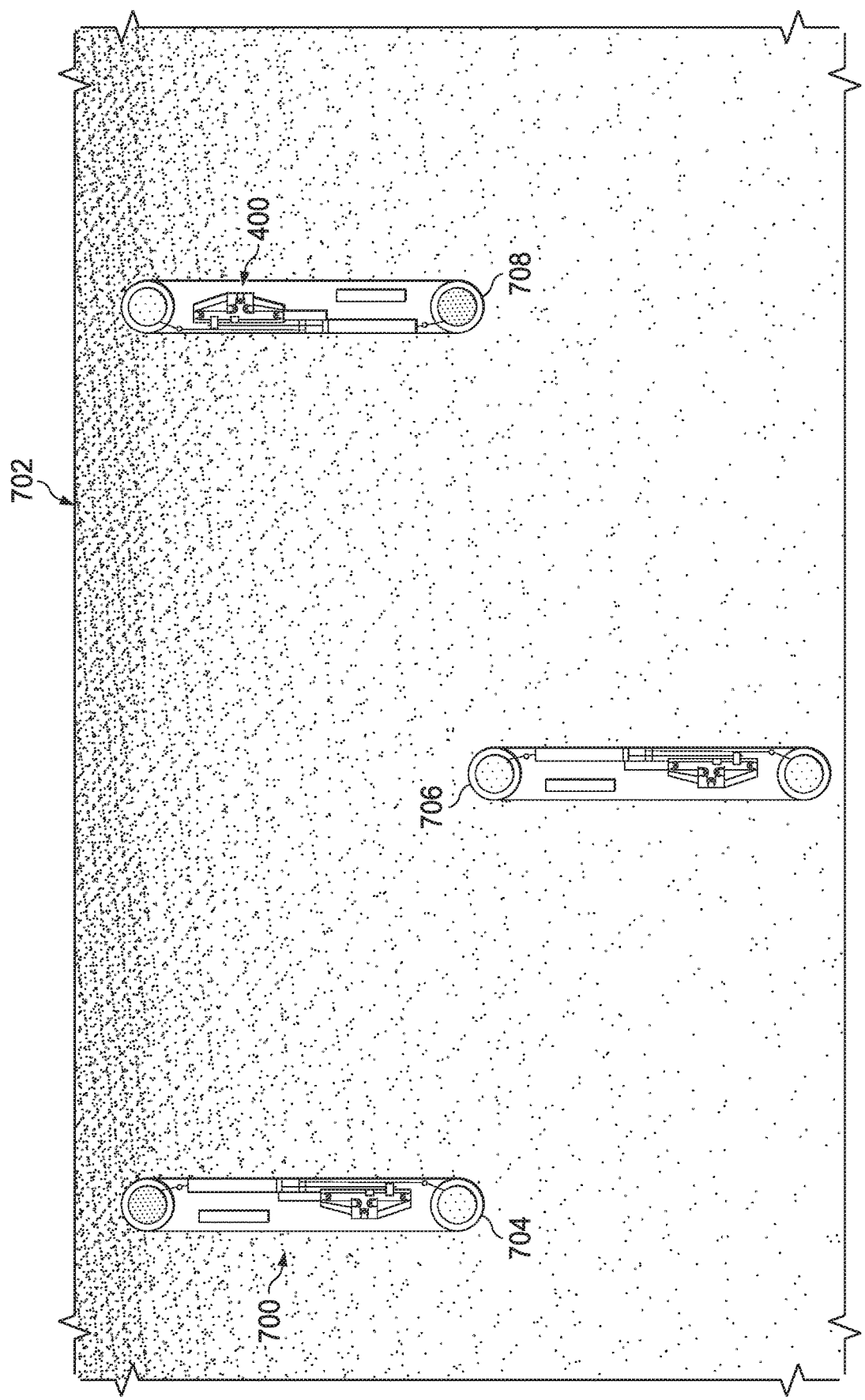
FIGS. 7 through 9 illustrate example uses of the power generation system of FIG. 4 in accordance with this disclosure.
Figure 8:
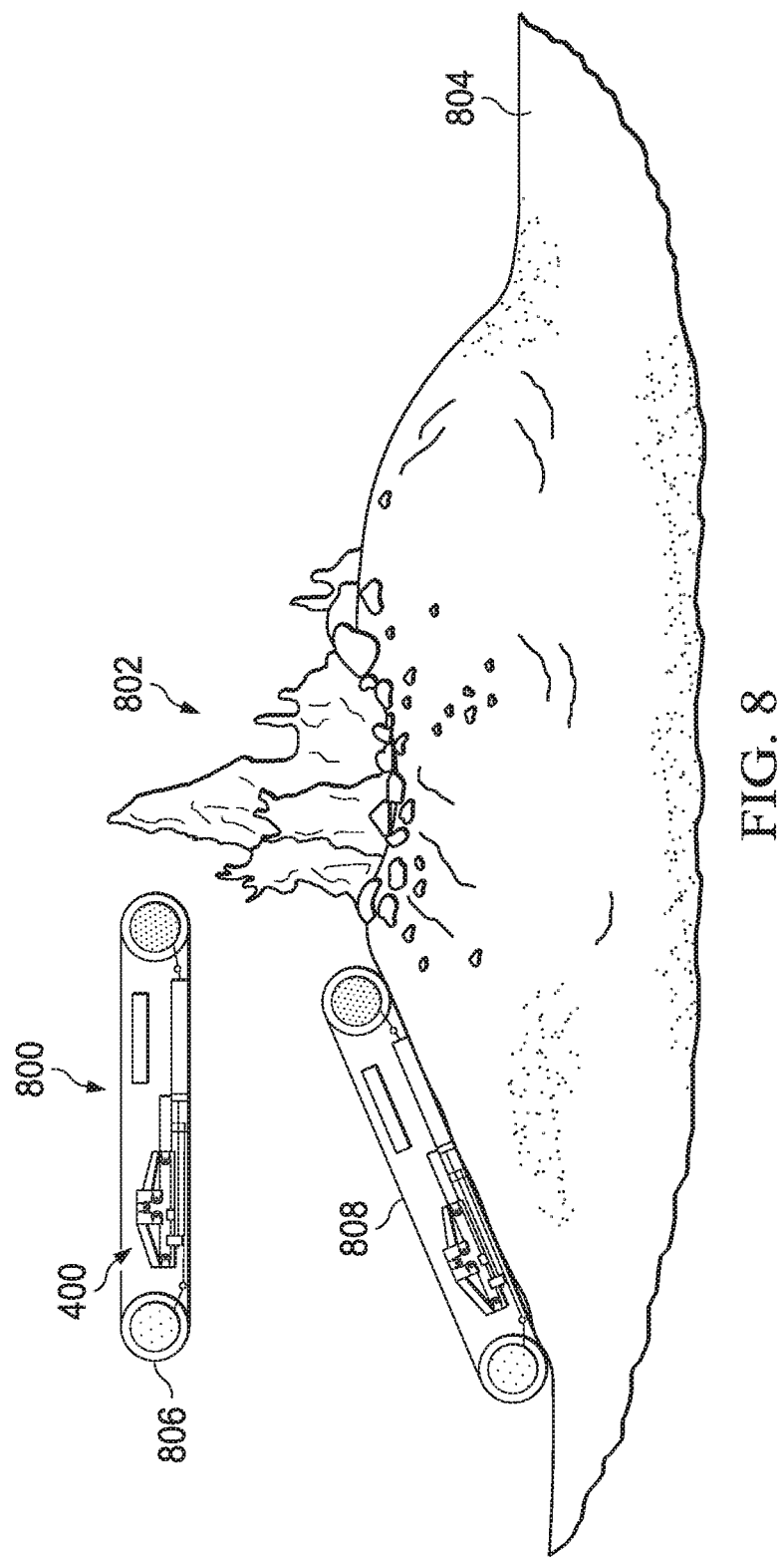
Figure 9:
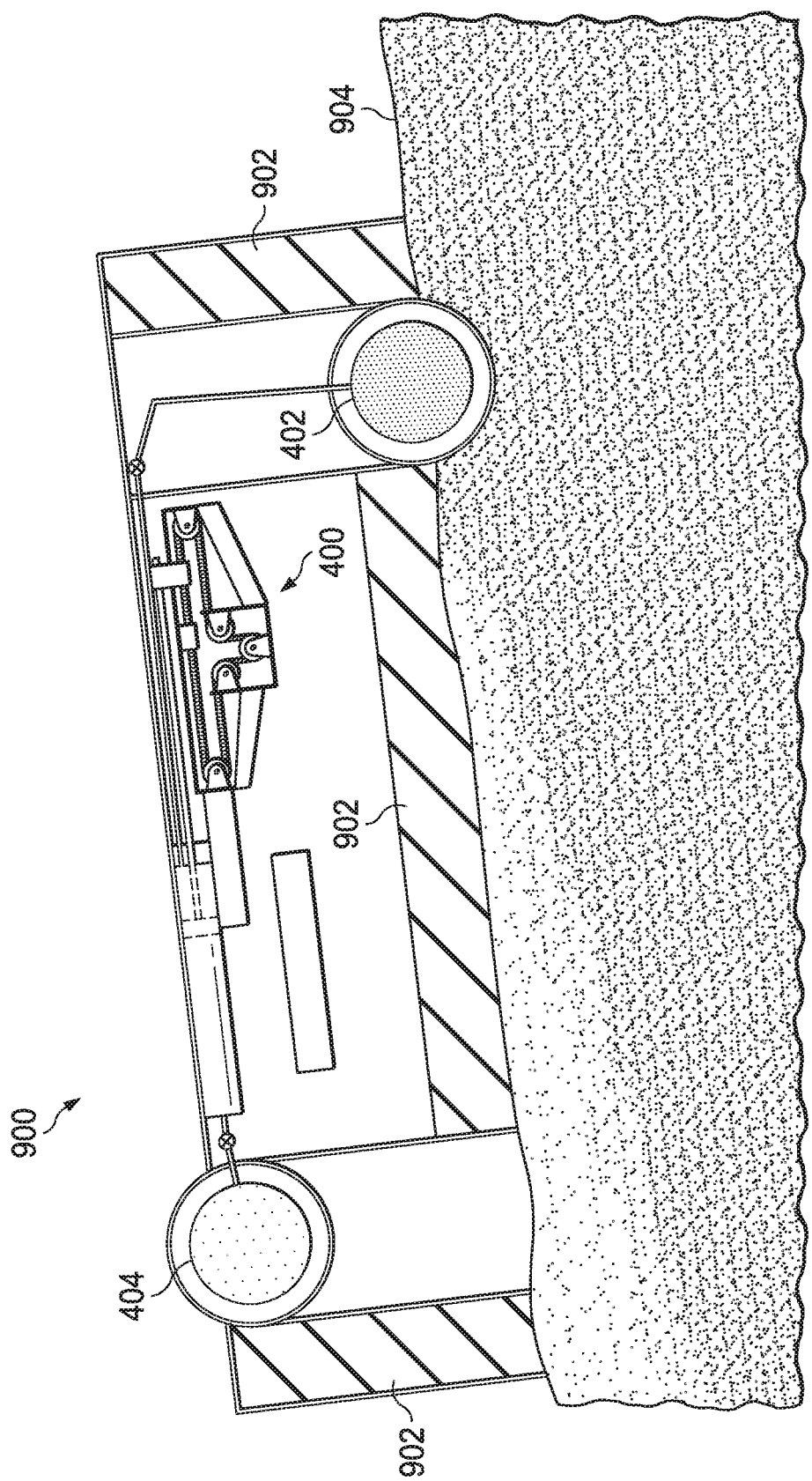

FIGS. 7 through 9 illustrate example uses of the power generation system 400 of FIG. 4 in accordance with this disclosure. In particular, FIGS. 7 through 9 illustrate example ways in which thermal differences can be created between the tanks 402 and 404 in the power generation system 400 in order to create movement of the piston 420 and corresponding generation of electrical power by the electrical generator 604. Note, however, that thermal differences can be created between the tanks 402 and 404 in the power generation system 400 in other ways and that FIGS. 7 through 9 do no limit the ways in which the power generation system 400 can be used.

As shown in FIG. 7, a vehicle 700 that includes the power generation system 400 can obtain or operate at different depths within a body of water 702. At the surface or at shallower depths, one tank 402 or 404 of the power generation system 400 can be heated using warmer water. At deeper depths, another tank 404 or 402 of the power generation system 400 can be cooled using colder water. The resulting thermal differences between the tanks 402 and 404 creates a pressure differential between the refrigerant 410a-410b, enabling the refrigerant 410a or 410b to enter the cylinder 406 and the other refrigerant 410b or 410a to exit the cylinder 406 and create movement of the piston 420.

As a particular example of this functionality, assume that the vehicle 700 reaches a position 704 after having been at a deeper depth. Also assume that the tank 404 of the power generation system 400 was previously cooled at the deeper depth. Once in this position 704, the tank 402 of the power generation system 400 can be heated using warmer water, such as by allowing that tank 402 to soak in the warmer water for some period of time. Other or additional mechanisms (such as a solar collector or exposure to sunlight or warm ambient air) may also or alternatively be used to facilitate heating of the tank 402. Again, the other tank 404 of the power generation system 400 is much cooler as a result of having been cooled previously at the lower depth, creating a pressure differential between the tanks 402 and 404. Thus, the valves 414 and 418 of the power generation system 400 can then be opened in order to create movement of the piston 420 and the chain 502 as the refrigerant 410a associated with the warmer tank 402 enters the cylinder 406 and the refrigerant 410b associated with the colder tank 404 enters the colder tank 404. This may occur while the vehicle 700 remains at the position 704 or while the vehicle 700 is diving to a position 706 at a lower depth. Once power generation is complete, the valves 414 and 418 are closed, and the tank 402 that had contained the warmer refrigerant can be cooled, such as by using the water at the lower depth. Once that tank 402 is cooled, the vehicle 700 can ascend to a position 708 (which may or may not exactly match the position 704) in order to warm the other tank 404. This allows another power generation cycle to occur, although the next cycle causes the piston 420 of the power generation system 400 to move in the opposite direction from the prior cycle. This process can repeat any number of times as the power generation system 400 generates electrical power based on thermal differences between the tanks 402 and 404.

As shown in FIG. 8, a vehicle 800 that includes the power generation system 400 can also operate at or near a thermal vent 802 or on or near the ground (seabed) 804 around the thermal vent 802. For example, in a position 806, the vehicle 800 is buoyant and is floating in the water near the thermal vent 802. One end of the vehicle 800 can be positioned so that the thermal vent 802 or the warmer water around the thermal vent 802 can heat one tank 402 or 404 of the power generation system 400. The other tank 404 or 402 of the power generation system 400 can be cooled by the water that is farther from the thermal vent 802, or the vehicle 800 can maneuver away from the thermal vent 802 to collect colder water or otherwise cool the other tank 404 or 402. However created, a thermal difference between the tanks 402 and 404 facilitates power generation in the power generation system 400 as described above. In some embodiments, after a power generation cycle is complete, the vehicle 800 can flip or otherwise reposition itself to reverse the heating and cooling of the tanks 402 and 404 in order to facilitate another power generation cycle, which can occur any desired number of times.

In a position 808, the vehicle 800 is generally resting at least partially on the ground 804 around the thermal vent 802. In this position 808, one end of the vehicle 800 can be positioned so that the warmer ground 804 around the thermal vent 802 or warmer water immediately above the ground 804 can heat one tank 402 or 404 of the power generation system 400. The other tank 404 or 402 of the power generation system 400 can be cooled by the water that is farther from the ground 804, or the vehicle 800 can maneuver away from the ground 804 to collect colder water or otherwise cool the other tank 404 or 402. Again, however created, a thermal difference between the tanks 402 and 404 facilitates power generation in the power generation system 400 as described above. In some embodiments, after a power generation cycle is complete, the vehicle 800 can flip or otherwise reposition itself to reverse the heating and cooling of the tanks 402 and 404 in order to facilitate another power generation cycle, which can occur any desired number of times.

As shown in FIG. 9, a vehicle 900 includes a modified version of the power generation system 400. In the example shown in FIG. 9, the tanks 402 and 404 of the power generation system 400 are not collinear with the energy conversion system 408 as is shown in FIGS. 4 through 8. Rather, in FIG. 9, at least one of the tanks 402 and 404 is repositioned so that the tanks 402 and 404 are disposed diagonally with respect to one another and are located on opposite longer sides of the vehicle 900. The vehicle 900 also includes additional insulation 902 that can be used to help facilitate heating/cooling of the tanks 402 and 404 and increase the thermal differences that can be obtained between the tanks 402 and 404.

By positioning the tanks 402 and 404 on opposite sides of the vehicle 900 in this manner, the vehicle 900 may physically rest on the ground 904, such as on a thermal mound underwater, with one tank 402 or 404 resting against the ground 904 and the other tank 404 or 402 pointing away from the ground 904. In this arrangement, one tank 402 or 404 can be heated and the other tank 404 or 402 can be cooled at the same time. Of course, nothing prevents the tanks 402 and 404 from being heated and cooled at different times, such as when one tank is cooled prior to setting the vehicle 900 down on the ground 904 to warm the other tank (or vice versa). Note here that the tanks 402 and 404 may or may not include the insulating structures 428 and 430. For instance, the insulating structures 428 and 430 may be omitted if an adequate temperature differential can be obtained through direct contact or indirect contact (such as via heat exchangers) with the warmer ground 904 and the colder water.

Although FIGS. 7 through 9 illustrate examples of uses of the power generation system 400 of FIG. 4, various changes may be made to FIGS. 7 through 9. For example, the power generation system 400 of FIG. 4 may be used in any other suitable manner. Also, as can be seen here, components of the power generation system 400 may be repositioned or otherwise modified in any suitable manner to facilitate the use of the power generation system 400 in specific applications. For instance, components of the power generation system 400 may be repositioned in any other suitable manner to facilitate warming and/or cooling of one or more tanks 402 and 404 of the power generation system 400.

Figure 10:
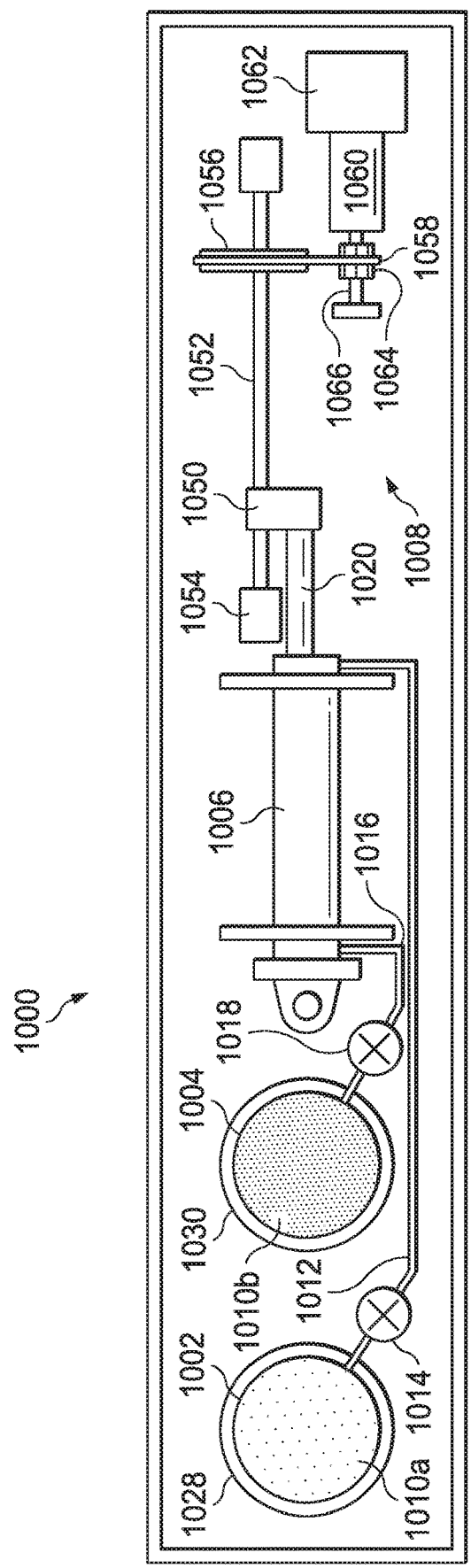
FIG. 10 illustrates a second example power generation system based on thermal differences using slow-motion high-force energy conversion and an example of its use in accordance with this disclosure.

FIG. 10 illustrates a second example power generation system 1000 based on thermal differences using slow-motion high-force energy conversion and an example of its use in accordance with this disclosure. The power generation system 1000 may, for example, represent or form a part of the power generator 312 described above and be used in the underwater vehicle 100 or 200 described above. Note, however, that the power generation system 1000 may be used in any other suitable vehicle or other system in order to generate power.

As shown in FIG. 10, the power generation system 1000 includes first and second tanks 1002 and 1004 respectively configured to hold a refrigerant 1010a and 1010b under pressure, and the first and second tanks 1002 and 1004 may be associated with insulating structures 1028 and 1030. The power generation system 1000 also includes first and second fluid lines 1012 and 1016 respectively coupled to the first and second tanks 1002 and 1004. The power generation system 1000 further includes first and second valves 1014 and 1018 each configured to control the flow of the respective refrigerant 1010a and 1010b through the respective fluid line 1012 and 1016. In addition, the power generation system 1000 includes a cylinder 1006 and a piston 1020 that divides the space within the cylinder 1006 into volumes for holding the refrigerant 1010a-1010b from the tanks 1002 and 1004. These components may be the same as or similar to the corresponding components discussed above with respect to FIG. 4. Although not shown here, the vehicle 1000 may also include a control unit, which may be the same as or similar to the control unit 426 of FIG. 4.

The power generation system 1000 also includes a slow-motion high-force energy conversion system 1008. Unlike the energy conversion system 408 that uses a chain drive, the energy conversion system 1008 shown in FIG. 10 uses a ball screw design to translate linear movement of the piston 1020 into rotational movement for electrical power generation. In this example, the piston 1020 is coupled to a ball screw 1050, which is configured to slide along a ball screw shaft 1052. The ball screw 1050 typically includes ball bearings, and the ball screw shaft 1052 typically represents a threaded shaft having at least one helical groove along an outer surface of a cylindrical structure that functions as a raceway for the ball bearings. Ends of the ball screw shaft 1052 can be secured in place using thrust and side load bearings 1054.

The load bearings 1054 help to maintain the ball screw shaft 1052 generally in place while allowing rotation of the ball screw shaft 1052 about its longitudinal axis (which extends through the center of the ball screw shaft 1052 along the length of the ball screw shaft 1052).

The ball screw 1050 can be moved back and forth based on the back-and-forth motion of the piston 1020, which is caused by movement of the refrigerant 1010a-1010b into and out of the tanks 1002 and 1004 and the cylinder 1006. Movement of the ball screw 1050 along the ball screw shaft 1052 causes rotation of the ball screw shaft 1052 about its axis, which is due to the helical groove in the ball screw shaft 1052. A sprocket 1056 is attached to the ball screw shaft 1052 and rotates when the ball screw shaft 1052 rotates. The sprocket 1056 contacts a chain 1058 and causes rotation of the chain 1058 as the sprocket 1056 and ball screw shaft 1052 rotate.

The rotation of the chain 1058 is translated from a slower rotational speed to a higher rotational speed by a gearbox 1060, which couples the higher rotational speed into an electrical generator 1062. The gearbox 1060 and the electrical generator 1062 may be the same as or similar to the gearbox 602 and the electrical generator 604 described above. In addition to the increase in rotational speed provided by the gearbox 1060, an additional increase in rotational speed may be provided if the chain 1058 wraps around an additional sprocket 1064 that is coupled to a shaft 1066 of the gearbox 1060 and the additional sprocket 1064 has a smaller size or diameter than the sprocket 1056. In some embodiments, for example, a 1.01:1 to a 3:1 speedup of rotational motion can be achieved using sprockets 1056 and 1064 of different sizes, although other speedups of rotational motion may also be achieved (or no speedup may be needed).

As a particular example of the speedup of rotational motion, consider a ball screw 1050 that causes sixty rotations of the ball screw shaft 1052 in one minute. Thus, a rotational speed of 60 RPMs is introduced into the ball screw shaft 1052 based on the movement of the piston 1020. If the chain 1058 introduces a 1.5:1 speedup of rotational motion and the gearbox 1060 introduces another 10:1 to 20:1 speedup of rotational motion, the rotational motion of the ball screw shaft 1052 can be translated into 900 RPMs to 1,800 RPMs of a shaft coupled to the electrical generator 1062. Note, however, that the numbers of stages and gears in the gearbox 1060 and the speedup of rotational motion by the chain 1058 and the gearbox 1060 are for illustration only.

As with the power generation 400, note that the cylinder 1006 and the piston 1020 can be sized to provide a desired amount of back-and-forth movement in order to support a desired amount of power generation in the system 1000. For example, the cylinder 1006 may have a length of about four to six feet (about 1.2 to 1.8 meters). The piston 1020 can also have a similar length or be longer or shorter as needed to allow movement of the piston 1020 along at least a substantial portion of the cylinder 1006.

Although FIG. 10 illustrates a second example of a power generation system 1000 based on thermal differences using slow-motion high-force energy conversion, various changes may be made to FIG. 10. For example, the arrangement of the components shown in FIG. 10 is for illustration only. The tanks 1002 and 1004, cylinder 1006, energy conversion system 1008, or other components shown in FIG. 10 may be placed in any other suitable arrangement. As a particular example, the tanks 1002 and 1004 may be placed at opposite ends of the power generation system 1000. Also, the relative sizes, shapes, and dimensions of the components shown in FIG. 10 are for illustration only. In addition, the power generation system 1000 of FIG. 10 may be used in any other suitable manner.

Figure 11:
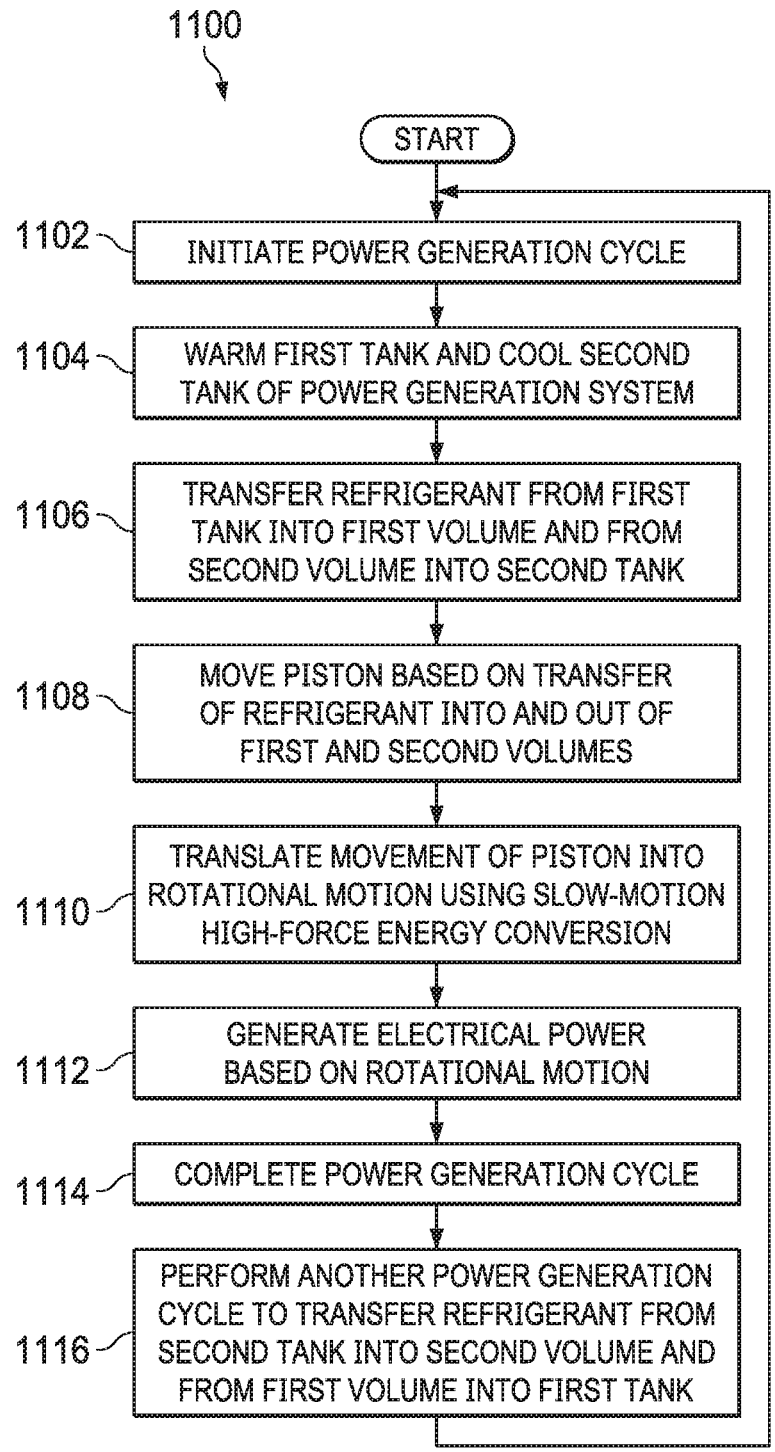
FIG. 11 illustrates an example method for power generation based on thermal differences using slow-motion high-force energy conversion in accordance with this disclosure.

FIG. 11 illustrates an example method 1100 for power generation based on thermal differences using slow-motion high-force energy conversion in accordance with this disclosure. For ease of explanation, the method 1100 is described as involving the use of the power generation system 400 or 1000 in the underwater vehicle 100 or 200 described above. Note, however, that the method 1100 may involve the use of any other suitable power generation system designed in accordance with this disclosure and may involve the use of any other suitable vehicle.

As shown in FIG. 11, a power generation cycle is initiated at step 1102. This may include, for example, a controller 302 or control unit 426 determining that a prior power generation cycle has completed or that a vehicle 100, 200, 300, 700, 800, 900 may require additional power. This may also include the controller 302 or control unit 426 receiving a command to initiate the power generation cycle or detecting that a specified amount of time has elapsed. In general, power generation cycles can be initiated in response to any suitable criteria being satisfied.

A first tank of refrigerant is warmed and a second tank of refrigerant is cooled at step 1104. This may include, for example, heating the tank 402, 1002 using warmer water (possibly captured in the insulating structure 428, 1028) to increase the pressure within the tank 402, 1002. In some instances, the warmer water can represent water that was captured at or near the surface of a body of water, water that was captured at or near a thermal vent or thermal mound, or water that was warmed using solar energy. This can also include cooling the tank 404, 1004 using colder water (possibly captured in the insulating structure 430, 1030) to decrease the pressure within the tank 404, 1004. In some instances, the colder water can represent water that was captured below the surface of a body of water, water that was captured farther away from a thermal vent or thermal mound, or water that was cooled through radiative or convective cooling. As a particular example, the flood ports 110, 210 may be used to allow water of different temperatures to enter into the interior of a vehicle and soak the tanks 402, 1002 and 404, 1004 in order to heat/cool the refrigerant 410$a$, 1010$a$ and 410$b$, 1010$b$ in the tanks 402 and 404. Other possible mechanisms for heating/cooling the tanks are provided above.

Refrigerant is transferred from the first tank into a first volume and from a second volume into the second tank at step 1106. This may include, for example, the controller 302 or control unit 426 opening the valves 414, 1014 and 418, 1018. This may also include the refrigerant 410$a$, 1010$a$ flowing out of the tank 402, 1002 into one volume in the cylinder 406, 1006 defined by the head of the piston 420, 1020 within the cylinder 406, 1006. This may further include the refrigerant 410$b$, 1010$b$ flowing out of the tank 404, 1004 into another volume in the cylinder 406, 1006 defined by the head of the piston 420, 1020 within the cylinder 406, 1006. The higher temperature/pressure of the tank 402, 1002 and the lower temperature/pressure of the tank 404, 1004 help to facilitate these transfers of the refrigerant. The transfers of the refrigerant result in movement of the piston at step 1108. This may include, for example, the head of the piston 420, 1020 moving to expand the volume of the cylinder 406, 1006 containing the higher-pressure refrigerant 410$a$, 1010$a$ and shrinking the volume of the cylinder 406, 1006 containing the lower-pressure refrigerant 410$b$, 1010$b$.

Movement of the piston is translated into rotational motion using slow-motion high-force energy conversion at step 1110. In some embodiments, this may include rotating a chain 502 coupled to the piston 420 and using a gearbox 602 to translate the slower rotational motion of the chain 502 into higher-rotational motion. In other embodiments, this may include moving a ball screw 1050 coupled to the piston 1020 along a ball screw shaft 1052, causing the ball screw shaft 1052 and a chain 1058 to rotate, and using a gearbox 1060 to translate the slower rotational motion of the chain 1058 into higher-rotational motion. Note that these are examples only and that other mechanisms for slow-motion high-force energy conversion may be used here. Electrical power is generated based on the rotational motion at step 1112. This may include, for example, the generator 604, 1062 producing electrical power based on the rotational motion provided by the gearbox 602, 1060.

Eventually, the transfer of refrigerant is completed, which ends the power generation cycle at step 1114. At this point, the valves 414, 1014 and 418, 1018 can be closed. Note that some refrigerant may remain in the first tank, and the amount can vary depending on the temperatures and pressures of the tanks. However, the amount of refrigerant transferred to and from the cylinder 406, 1006 is ideally adequate to generate enough electrical power. At this point, another power generation cycle can occur to transfer the refrigerant from the second tank into the second volume and from the first volume into the first tank at step 1116. This may include, for example, performing steps 1104-1114 again but with the temperatures/pressures of the tanks 402, 1002 and 404, 1004 reversed. This generates additional electrical energy that can be stored or used.

Although FIG. 11 illustrates one example of a method 1100 for power generation based on thermal differences using slow-motion high-force energy conversion, various changes may be made to FIG. 11. For example, while FIG. 11 shows a series of steps, various steps in FIG. 11 can overlap, occur in parallel, occur in a different order, or occur any number of times. As particular examples, steps 1106-1112 can occur concurrently since it is the transfer of refrigerant that leads to movement of the piston and generation of electrical energy.

It should be noted that while various power generation systems and methods are described above as being used to power an underwater vehicle, the power generation systems and methods can be used in other ways. For example, the power generation systems and methods can be used to charge power carriers, such as those described in U.S. Patent Application Publication No. 2018/0072168 (which is hereby incorporated by reference in its entirety). The power carriers can then be used in any suitable manner, such as to power underwater vehicles or provide electricity to other devices or systems. With an adequate number of power generation systems (and optionally an adequate number of power carriers), a large amount of power can be made available for use.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   first and second tanks each configured to receive and store a refrigerant under pressure;
   a cylinder defining a space configured to receive the refrigerant from the first and second tanks;
   a piston passing into the cylinder and comprising a head, the head dividing the space within the cylinder into a first volume for the refrigerant from the first tank and a second volume for the refrigerant from the second tank;
   a converter configured to translate linear movement of the piston into rotational motion; and
   a generator configured to produce electrical power based on the rotational motion;
   wherein the converter extends lengthwise from an end of the cylinder and is adjacent to the piston, the converter comprising:
      a chain coupled to a portion of the piston that remains outside the cylinder, the chain configured to rotate based on the linear movement of the piston; and
      a gearbox configured to convert a slower rotational motion of the chain into a faster rotational motion, the generator configured to produce the electrical power based on the faster rotational motion.

2. The apparatus of claim 1, wherein:
   the converter further comprises a rigid frame, the gearbox coupled to the rigid frame; and
   the chain is securely routed around multiple sides of the gearbox within the rigid frame.

3. The apparatus of claim 1, wherein the gearbox comprises a multi-stage set of gears.

4. The apparatus of claim 1, further comprising:
   a body configured to contain the first and second tanks, the cylinder, the piston, the converter, and the generator;
   wherein the first and second tanks are positioned on opposite sides of the body.

5. The apparatus of claim 1, wherein a flow of the refrigerant between the first tank and the first volume of the cylinder and a flow of the refrigerant between the second tank and the second volume of the cylinder are based on at least one of a temperature differential and a pressure differential between the tanks.

6. An apparatus comprising:
   first and second tanks each configured to receive and store a refrigerant under pressure;
   a cylinder defining a space configured to receive the refrigerant from the first and second tanks;
   a piston passing into the cylinder and comprising a head, the head dividing the space within the cylinder into a first volume for the refrigerant from the first tank and a second volume for the refrigerant from the second tank;
   a converter configured to translate linear movement of the piston into rotational motion; and
   a generator configured to produce electrical power based on the rotational motion;
   wherein the converter comprises:
      a ball screw coupled to the piston, the ball screw configured to move along a ball screw shaft based on the linear movement of the piston and cause rotation of the ball screw shaft;
      a chain configured to be rotated by the ball screw shaft; and
      a gearbox configured to convert a slower rotational motion of the chain into a faster rotational motion, the generator configured to produce the electrical power based on the faster rotational motion.

7. The apparatus of claim 6, wherein the converter further comprises:
   a first sprocket coupled to the ball screw shaft and configured to rotate the chain; and
   a second sprocket coupled to a shaft of the gearbox and configured to be rotated by the chain, the second sprocket having a smaller size than the first sprocket.

8. An apparatus comprising:
first and second tanks each configured to receive and store a refrigerant under pressure;
a cylinder defining a space configured to receive the refrigerant from the first and second tanks;
a piston passing into the cylinder and comprising a head, the head dividing the space within the cylinder into a first volume for the refrigerant from the first tank and a second volume for the refrigerant from the second tank;
a converter configured to translate linear movement of the piston into rotational motion;
a generator configured to produce electrical power based on the rotational motion; and
a body configured to contain the first and second tanks, the cylinder, the piston, the converter, and the generator;
wherein the first and second tanks, the cylinder, the piston, the converter, and the generator are collinear in the body.

9. A system comprising:
a vehicle comprising a body and a power generation system;
wherein the power generation system comprises:
first and second tanks each configured to receive and store a refrigerant under pressure;
a cylinder defining a space configured to receive the refrigerant from the first and second tanks;
a piston passing into the cylinder and comprising a head, the head dividing the space within the cylinder into a first volume for the refrigerant from the first tank and a second volume for the refrigerant from the second tank;
a converter configured to translate linear movement of the piston into rotational motion; and
a generator configured to produce electrical power based on the rotational motion;
wherein the converter extends lengthwise from an end of the cylinder and is adjacent to the piston, the converter comprising:
a chain coupled to a portion of the piston that remains outside the cylinder, the chain configured to rotate based on the linear movement of the piston; and
a gearbox configured to convert a slower rotational motion of the chain into a faster rotational motion, the generator configured to produce the electrical power based on the faster rotational motion.

10. The system of claim 9, wherein:
the converter further comprises a rigid frame, the gearbox coupled to the rigid frame; and
the chain is securely routed around multiple sides of the gearbox within the rigid frame.

11. The system of claim 9, wherein the first and second tanks are positioned on opposite sides of the body.

12. The system of claim 9, wherein a flow of the refrigerant between the first tank and the first volume of the cylinder and a flow of the refrigerant between the second tank and the second volume of the cylinder are based on at least one of a temperature differential and a pressure differential between the tanks.

13. The system of claim 9, wherein the vehicle comprises an underwater vehicle.

14. A system comprising:
a vehicle comprising a body and a power generation system;
wherein the power generation system comprises:
first and second tanks each configured to receive and store a refrigerant under pressure;
a cylinder defining a space configured to receive the refrigerant from the first and second tanks;
a piston passing into the cylinder and comprising a head, the head dividing the space within the cylinder into a first volume for the refrigerant from the first tank and a second volume for the refrigerant from the second tank;
a converter configured to translate linear movement of the piston into rotational motion; and
a generator configured to produce electrical power based on the rotational motion;
wherein the converter comprises:
a ball screw coupled to the piston, the ball screw configured to move along a ball screw shaft based on the linear movement of the piston and cause rotation of the ball screw shaft;
a chain configured to be rotated by the ball screw shaft; and
a gearbox configured to convert a slower rotational motion of the chain into a faster rotational motion, the generator configured to produce the electrical power based on the faster rotational motion.

15. The system of claim 14, wherein the gearbox comprises a multi-stage set of gears.

16. The system of claim 14, wherein the converter further comprises:
a first sprocket coupled to the ball screw shaft and configured to rotate the chain; and
a second sprocket coupled to a shaft of the gearbox and configured to be rotated by the chain, the second sprocket having a smaller size than the first sprocket.

17. A system comprising:
a vehicle comprising a body and a power generation system;
wherein the power generation system comprises:
first and second tanks each configured to receive and store a refrigerant under pressure;
a cylinder defining a space configured to receive the refrigerant from the first and second tanks;
a piston passing into the cylinder and comprising a head, the head dividing the space within the cylinder into a first volume for the refrigerant from the first tank and a second volume for the refrigerant from the second tank;
a converter configured to translate linear movement of the piston into rotational motion; and
a generator configured to produce electrical power based on the rotational motion;
wherein the first and second tanks, the cylinder, the piston, the converter, and the generator are collinear in the body.

18. A method comprising:
creating flows of refrigerant between first and second tanks and first and second volumes of a cylinder, each of the first and second tanks configured to receive and store the refrigerant under pressure, the cylinder defining a space configured to receive the refrigerant from the first and second tanks;
moving a piston passing into the cylinder and comprising a head, the head dividing the space within the cylinder into a first volume for the refrigerant from the first tank and a second volume for the refrigerant from the second tank;
translating linear movement of the piston into rotational motion; and producing electrical power based on the rotational motion;

wherein translating the linear movement of the piston into the rotational motion comprises using a converter that extends lengthwise from an end of the cylinder and is adjacent to the piston, wherein using the converter comprises:

rotating a chain coupled to a portion of the piston, which remains outside the cylinder, based on the linear movement of the piston; and using a gearbox to convert a slower rotational motion of the chain into a faster rotational motion, the electrical power produced based on the faster rotational motion.

19. The method of claim 18, wherein:

the gearbox is coupled to a rigid frame of the converter; and the chain is securely routed around multiple sides of the gearbox within the rigid frame.

20. A method comprising:

creating flows of refrigerant between first and second tanks and first and second volumes of a cylinder, each of the first and second tanks configured to receive and store the refrigerant under pressure, the cylinder defining a space configured to receive the refrigerant from the first and second tanks;

moving a piston passing into the cylinder and comprising a head, the head dividing the space within the cylinder into a first volume for the refrigerant from the first tank and a second volume for the refrigerant from the second tank;

translating linear movement of the piston into rotational motion; and producing electrical power based on the rotational motion;

wherein translating the linear movement of the piston into the rotational motion comprises:

moving a ball screw coupled to the piston along a ball screw shaft to cause rotation of the ball screw shaft;

rotating a chain using the ball screw shaft; and using a gearbox to convert a slower rotational motion of the chain into a faster rotational motion, the electrical power produced based on the faster rotational motion.

* * * * *